United States Patent [19]

Pavlidis et al.

[11] Patent Number: 5,796,090

[45] Date of Patent: Aug. 18, 1998

[54] MICROFILM READER FOR HIGH DENSITY, TWO DIMENSIONAL BAR CODE SYMBOLOGY

[75] Inventors: Theodosios Pavlidis, Setauket; Ynjiun Paul Wang, Port Jefferson Station; Jerome Swartz, Old Field, all of N.Y.

[73] Assignee: Symbol Technologies, Inc., Holtsville, N.Y.

[21] Appl. No.: 625,998

[22] Filed: Apr. 1, 1996

Related U.S. Application Data

[62] Division of Ser. No. 329,635, Oct. 26, 1994, Pat. No. 5,504,322, which is a division of Ser. No. 126,965, Sep. 27, 1993, Pat. No. 5,399,846, which is a division of Ser. No. 461,881, Jan. 5, 1990, Pat. No. 5,304,786.

[51] Int. Cl.$^6$ ........................................... G06K 7/10
[52] U.S. Cl. .................................. 235/462; 235/454
[58] Field of Search ............................. 235/462, 454, 235/463, 494

[56] References Cited

U.S. PATENT DOCUMENTS

| | | | |
|---|---|---|---|
| 4,174,890 | 11/1979 | Johnson et al. | 353/26 A |
| 4,174,891 | 11/1979 | Flint et al. | 353/26 A |
| 4,283,621 | 8/1981 | Pembroke | 235/375 |
| 4,429,385 | 1/1984 | Cichelli et al. | 370/92 |
| 4,608,489 | 8/1986 | Ramsey et al. | 235/462 |
| 4,645,916 | 2/1987 | Raisleger | 235/494 |
| 4,972,068 | 11/1990 | Ohtani et al. | 235/375 |
| 5,247,575 | 9/1993 | Sprague et al. | 380/9 |

*Primary Examiner*—Donald T. Hajec
*Assistant Examiner*—Karl Frech
*Attorney, Agent, or Firm*—Finnegan, Henderson, Farabow, Garrett & Dunner, L.L.P.

[57] ABSTRACT

A microfilm reader, which includes a bar code scanner, a controller, and a keyboard, receives microfilm containing documents and corresponding bar code symbols. Each bar code symbol contains data describing the contents of a respective document. The bar code scanner reads the bar code symbols located on the microfilm and transmits data representing the read bar code symbols to the controller. The controller determines whether the data received from the bar code scanner satisfies search criteria entered into the keyboard.

28 Claims, 28 Drawing Sheets

| | | | | | | | |
|---|---|---|---|---|---|---|---|
| original text | H | U | D | — | 3 | 2 | 9 |
| Fig. 5 lookup value | 7 | 20 | 3 | 26 | 28 | 3 | 2 | 9 |
| | ⌊__Alpha mode__⌋ | | | | ⌊ms⌋ | ⌊__Mixed mode__⌋ | |
| encoding of each pair into base-30 digits | ⌊_7*30+20_⌋ | | ⌊_3*30+26_⌋ | | ⌊_28*30+3_⌋ | | ⌊_2*30+9_⌋ | |
| codeword to use | 230 | | 116 | | 843 | | 69 | |

| row 0 | Cluster0 |
| --- | --- |
| row 1 | Cluster3 |
| row 2 | Cluster6 |
| row 4 | Cluster0 |
|  |  |
| row n | Cluster (n mod 3)*3 |

| Value/Mode | Alpha | Mixed | Numeric | User(s) | |
|---|---|---|---|---|---|
| 0 | A | 0 | 0 | | |
| 1 | B | 1 | ↑ | | |
| 2 | C | 2 | | | |
| 3 | D | 3 | | | |
| 4 | E | 4 | | user | |
| 5 | F | 5 | | defined | |
| 6 | G | 6 | | value | |
| 7 | H | 7 | | | |
| 8 | I | 8 | | | |
| 9 | J | 9 | | | |
| 10 | K | A | | | |
| 11 | L | B | | mode 3 | mode 20 |
| 12 | M | C | | to | to |
| 13 | N | D | | mode 19 | mode 29 |
| 14 | O | E | to | | |
| 15 | P | F | | | |
| 16 | Q | ! | | | |
| 17 | R | $ | | | |
| 18 | S | % | | | |
| 19 | T | & | | | |
| 20 | U | * | | | |
| 21 | V | ( | | | |
| 22 | W | ) | | | |
| 23 | X | - | | | |
| 24 | Y | + | | | |
| 25 | Z | = | | | |
| 26 | - | / | | | |
| 27 | space | : | | | |
| 28 | ms | as | | | |
| 29 | us | us | | us | |
| 30 to 925 | | | | | |
| 926 | | | 925 space | | |
| 927 | | | as | | as |
| 928 | | | ms | | ms |

FIG. 5

| | H | U | D | – | 3 | 2 | 9 |
|---|---|---|---|---|---|---|---|
| original text | | | | | | | |
| Fig. 5 lookup value | 7 | 20 | 3 | 26 | 28 | 3 | 2 | 9 |

Alpha mode: H U / D –  → 7, 20 / 3, 26
Mixed mode: 3 2 9 → 3, 2, 9 (with ms: 28)

| encoding of each pair into base-30 digits | 7*30+20 | 3*30+26 | 28*30+3 | 2*30+9 |
|---|---|---|---|---|
| codeword to use | 230 | 116 | 843 | 69 |

FIG. 7

Encoder

Input

Output

| $a_{1,n-1}$ | $a_{1,n-2}$ | | $a_{1,1}$ | $a_{1,0}$ | $b_{1,r0}$ |
|---|---|---|---|---|---|
| $a_{2,n-1}$ | $a_{2,n-2}$ | | $a_{2,1}$ | $a_{2,0}$ | $b_{2,r0}$ |
| | | | | | |
| $a_{m-1,n-1}$ | $a_{m-1,n-2}$ | | $a_{m-1,1}$ | $a_{m-1,0}$ | $b_{m-1,r0}$ |
| $a_{m,n-1}$ | $a_{m,n-2}$ | | $b_{s1}$ | $b_{s0}$ | $b_{m,r0}$ |

Syndrome divider

| Table I : The t-sequence table. Cluster0 ||||||||||
|---|---|---|---|---|---|---|---|---|---|
| t-seq | val | t-seq | val | t-seq | val | t-seq | val | t-seq | val |
| 222266 | 0 | 226655 | 50 | 244664 | 100 | 324545 | 150 | 334333 | 200 |
| 222277 | 1 | 226666 | 51 | 245542 | 101 | 324556 | 151 | 334344 | 201 |
| 222355 | 2 | 226733 | 52 | 245553 | 102 | 324645 | 152 | 334355 | 202 |
| 222366 | 3 | 226755 | 53 | 245564 | 103 | 324656 | 153 | 334366 | 203 |
| 222444 | 4 | 227722 | 54 | 245653 | 104 | 325523 | 154 | 334377 | 204 |
| 222455 | 5 | 227744 | 55 | 245664 | 105 | 325534 | 155 | 334433 | 205 |
| 222466 | 6 | 227766 | 56 | 245764 | 106 | 325545 | 156 | 334444 | 206 |
| 222477 | 7 | 233354 | 57 | 246642 | 107 | 325556 | 157 | 334455 | 207 |
| 222555 | 8 | 233365 | 58 | 246653 | 108 | 325567 | 158 | 334466 | 208 |
| 222566 | 9 | 233443 | 59 | 246664 | 109 | 325634 | 159 | 334533 | 209 |
| 222666 | 10 | 233454 | 60 | 246675 | 110 | 325645 | 160 | 334544 | 210 |
| 222677 | 11 | 233465 | 61 | 246764 | 111 | 325656 | 161 | 334555 | 211 |
| 223355 | 12 | 233476 | 62 | 247753 | 112 | 325745 | 162 | 334566 | 212 |
| 223366 | 13 | 233554 | 63 | 255552 | 113 | 326623 | 163 | 334577 | 213 |
| 223444 | 14 | 233565 | 64 | 255563 | 114 | 326634 | 164 | 334644 | 214 |
| 223455 | 15 | 233665 | 65 | 255574 | 115 | 326645 | 165 | 334655 | 215 |
| 223466 | 16 | 233676 | 66 | 255663 | 116 | 326656 | 166 | 334666 | 216 |
| 223544 | 17 | 234443 | 67 | 256652 | 117 | 326745 | 167 | 334755 | 217 |
| 223555 | 18 | 234454 | 68 | 256663 | 118 | 327734 | 168 | 335422 | 218 |
| 223566 | 19 | 234465 | 69 | 256674 | 119 | 332255 | 169 | 335433 | 219 |
| 223577 | 20 | 234476 | 70 | 257752 | 120 | 332266 | 170 | 335444 | 220 |
| 223655 | 21 | 234543 | 71 | 266662 | 121 | 332344 | 171 | 335455 | 221 |
| 223666 | 22 | 234554 | 72 | 267762 | 122 | 332355 | 172 | 335466 | 222 |
| 223677 | 23 | 234565 | 73 | 322245 | 123 | 332366 | 173 | 335477 | 223 |
| 224444 | 24 | 234654 | 74 | 322256 | 124 | 332444 | 174 | 335522 | 224 |
| 224455 | 25 | 234665 | 75 | 322267 | 125 | 332455 | 175 | 335533 | 225 |
| 224466 | 26 | 234765 | 76 | 322334 | 126 | 332466 | 176 | 335544 | 226 |
| 224533 | 27 | 235532 | 77 | 322345 | 127 | 332477 | 177 | 335555 | 227 |
| 224544 | 28 | 235543 | 78 | 322356 | 128 | 332555 | 178 | 335566 | 228 |
| 224555 | 29 | 235554 | 79 | 322445 | 129 | 332566 | 179 | 335577 | 229 |
| 224566 | 30 | 235565 | 80 | 322456 | 130 | 332577 | 180 | 335633 | 230 |
| 224577 | 31 | 235643 | 81 | 322467 | 131 | 332666 | 181 | 335644 | 231 |
| 224644 | 32 | 235654 | 82 | 322556 | 132 | 333244 | 182 | 335655 | 232 |
| 224655 | 33 | 235665 | 83 | 323334 | 133 | 333255 | 183 | 335666 | 233 |
| 224666 | 34 | 235676 | 84 | 323345 | 134 | 333266 | 184 | 335755 | 234 |
| 224755 | 35 | 235765 | 85 | 323356 | 135 | 333333 | 185 | 336522 | 235 |
| 225533 | 36 | 236632 | 86 | 323434 | 136 | 333344 | 186 | 336533 | 236 |
| 225544 | 37 | 236643 | 87 | 323445 | 137 | 333355 | 187 | 336544 | 237 |
| 225555 | 38 | 236654 | 88 | 323456 | 138 | 333366 | 188 | 336555 | 238 |
| 225566 | 39 | 236665 | 89 | 323467 | 139 | 333377 | 189 | 336566 | 239 |
| 225577 | 40 | 236743 | 90 | 323545 | 140 | 333433 | 190 | 336622 | 240 |
| 225633 | 41 | 236765 | 91 | 323556 | 141 | 333444 | 191 | 336633 | 241 |
| 225644 | 42 | 237732 | 92 | 323567 | 142 | 333455 | 192 | 336644 | 242 |
| 225655 | 43 | 237754 | 93 | 323656 | 143 | 333466 | 193 | 336655 | 243 |
| 225666 | 44 | 244442 | 94 | 324423 | 144 | 333477 | 194 | 336666 | 244 |
| 225744 | 45 | 244453 | 95 | 324434 | 145 | 333544 | 195 | 336744 | 245 |
| 225766 | 46 | 244464 | 96 | 324445 | 146 | 333555 | 196 | 337633 | 246 |
| 226622 | 47 | 244553 | 97 | 324456 | 147 | 333566 | 197 | 337655 | 247 |
| 226633 | 48 | 244564 | 98 | 324467 | 148 | 333655 | 198 | 337733 | 248 |
| 226644 | 49 | 244575 | 99 | 324534 | 149 | 333666 | 199 | 337755 | 249 |

FIG. 14A

| Table I : The t-sequence table. Cluster0 |||||||||
|---|---|---|---|---|---|---|---|---|
| t-seq | val | t-seq | val | t-seq | val | t-seq | val | t-seq | val |
| 343343 | 250 | 354453 | 300 | 424546 | 350 | 435523 | 400 | 444266 | 450 |
| 343354 | 251 | 354464 | 301 | 425524 | 351 | 435534 | 401 | 444277 | 451 |
| 343365 | 252 | 354475 | 302 | 425535 | 352 | 435545 | 402 | 444322 | 452 |
| 343376 | 253 | 354553 | 303 | 425546 | 353 | 435556 | 403 | 444333 | 453 |
| 343443 | 254 | 354564 | 304 | 425635 | 354 | 435634 | 404 | 444344 | 454 |
| 343454 | 255 | 354575 | 305 | 426624 | 355 | 435645 | 405 | 444355 | 455 |
| 343465 | 256 | 354664 | 306 | 426635 | 356 | 436523 | 406 | 444366 | 456 |
| 343554 | 257 | 355442 | 307 | 432234 | 357 | 436534 | 407 | 444377 | 457 |
| 343565 | 258 | 355453 | 308 | 432245 | 358 | 436545 | 408 | 444422 | 458 |
| 343665 | 259 | 355464 | 309 | 432256 | 359 | 436623 | 409 | 444433 | 459 |
| 344332 | 260 | 355542 | 310 | 432334 | 360 | 436634 | 410 | 444444 | 460 |
| 344343 | 261 | 355553 | 311 | 432345 | 361 | 436645 | 411 | 444455 | 461 |
| 344354 | 262 | 355564 | 312 | 432356 | 362 | 436734 | 412 | 444466 | 462 |
| 344365 | 263 | 355653 | 313 | 432367 | 363 | 437634 | 413 | 444477 | 463 |
| 344432 | 264 | 355664 | 314 | 432445 | 364 | 437734 | 414 | 444533 | 464 |
| 344443 | 265 | 356542 | 315 | 432456 | 365 | 442244 | 415 | 444544 | 465 |
| 344454 | 266 | 356553 | 316 | 432467 | 366 | 442255 | 416 | 444555 | 466 |
| 344465 | 267 | 356564 | 317 | 432556 | 367 | 442266 | 417 | 444566 | 467 |
| 344543 | 268 | 356642 | 318 | 433223 | 368 | 442333 | 418 | 444644 | 468 |
| 344554 | 269 | 356653 | 319 | 433234 | 369 | 442344 | 419 | 444655 | 469 |
| 344565 | 270 | 356664 | 320 | 433245 | 370 | 442355 | 420 | 445322 | 470 |
| 344576 | 271 | 356753 | 321 | 433256 | 371 | 442366 | 421 | 445333 | 471 |
| 344654 | 272 | 357653 | 322 | 433267 | 372 | 442377 | 422 | 445344 | 472 |
| 344665 | 273 | 357753 | 323 | 433323 | 373 | 442444 | 423 | 445355 | 473 |
| 345432 | 274 | 365552 | 324 | 433334 | 374 | 442455 | 424 | 445366 | 474 |
| 345443 | 275 | 365563 | 325 | 433345 | 375 | 442466 | 425 | 445422 | 475 |
| 345454 | 276 | 365663 | 326 | 433356 | 376 | 442555 | 426 | 445433 | 476 |
| 345465 | 277 | 366552 | 327 | 433367 | 377 | 442566 | 427 | 445444 | 477 |
| 345532 | 278 | 366563 | 328 | 433434 | 378 | 443233 | 428 | 445455 | 478 |
| 345543 | 279 | 366652 | 329 | 433445 | 379 | 443244 | 429 | 445466 | 479 |
| 345554 | 280 | 366663 | 330 | 433456 | 380 | 443255 | 430 | 445522 | 480 |
| 345565 | 281 | 367752 | 331 | 433545 | 381 | 443266 | 431 | 445533 | 481 |
| 345576 | 282 | 422224 | 332 | 433556 | 382 | 443277 | 432 | 445544 | 482 |
| 345643 | 283 | 422235 | 333 | 434323 | 383 | 443333 | 433 | 445555 | 483 |
| 345654 | 284 | 422246 | 334 | 434334 | 384 | 443344 | 434 | 445566 | 484 |
| 345665 | 285 | 422335 | 335 | 434345 | 385 | 443355 | 435 | 445633 | 485 |
| 345754 | 286 | 422346 | 336 | 434356 | 386 | 443366 | 436 | 445644 | 486 |
| 346532 | 287 | 422357 | 337 | 434367 | 387 | 443433 | 437 | 445655 | 487 |
| 346543 | 288 | 422446 | 338 | 434423 | 388 | 443444 | 438 | 446422 | 488 |
| 346554 | 289 | 423324 | 339 | 434434 | 389 | 443455 | 439 | 446433 | 489 |
| 346565 | 290 | 423335 | 340 | 434445 | 390 | 443466 | 440 | 446444 | 490 |
| 346632 | 291 | 423346 | 341 | 434456 | 391 | 443477 | 441 | 446455 | 491 |
| 346643 | 292 | 423435 | 342 | 434534 | 392 | 443544 | 442 | 446522 | 492 |
| 346654 | 293 | 423446 | 343 | 434545 | 393 | 443555 | 443 | 446533 | 493 |
| 346665 | 294 | 423546 | 344 | 434556 | 394 | 443566 | 444 | 446544 | 494 |
| 346754 | 295 | 424424 | 345 | 434645 | 395 | 443655 | 445 | 446555 | 495 |
| 347643 | 296 | 424435 | 346 | 435423 | 396 | 444222 | 446 | 446622 | 496 |
| 347732 | 297 | 424446 | 347 | 435434 | 397 | 444233 | 447 | 446633 | 497 |
| 347754 | 298 | 424457 | 348 | 435445 | 398 | 444244 | 448 | 446644 | 498 |
| 354442 | 299 | 424535 | 349 | 435456 | 399 | 444255 | 449 | 446655 | 499 |

FIG. 14B

| Table I : The t-sequence table. Cluster0 |||||||||
|---|---|---|---|---|---|---|---|---|
| t-seq | val | t-seq | val | t-seq | val | t-seq | val | t-seq | val |
| 446733 | 500 | 456643 | 550 | 533335 | 600 | 544445 | 650 | 554222 | 700 |
| 447522 | 501 | 456654 | 551 | 533346 | 601 | 544456 | 651 | 554233 | 701 |
| 447544 | 502 | 456743 | 552 | 533435 | 602 | 544534 | 652 | 554244 | 702 |
| 447633 | 503 | 457543 | 553 | 533446 | 603 | 544545 | 653 | 554255 | 703 |
| 447722 | 504 | 457643 | 554 | 534324 | 604 | 545323 | 654 | 554266 | 704 |
| 447744 | 505 | 457743 | 555 | 534335 | 605 | 545334 | 655 | 554322 | 705 |
| 453332 | 506 | 464442 | 556 | 534346 | 606 | 545345 | 656 | 554333 | 706 |
| 453343 | 507 | 464453 | 557 | 534424 | 607 | 545423 | 657 | 554344 | 707 |
| 453354 | 508 | 464464 | 558 | 534435 | 608 | 545434 | 658 | 554355 | 708 |
| 453365 | 509 | 464553 | 559 | 534446 | 609 | 545445 | 659 | 554366 | 709 |
| 453443 | 510 | 464564 | 560 | 534535 | 610 | 545523 | 660 | 554422 | 710 |
| 453454 | 511 | 465442 | 561 | 535424 | 611 | 545534 | 661 | 554433 | 711 |
| 453465 | 512 | 465453 | 562 | 535435 | 612 | 545545 | 662 | 554444 | 712 |
| 453476 | 513 | 465464 | 563 | 535524 | 613 | 545634 | 663 | 554455 | 713 |
| 453554 | 514 | 465542 | 564 | 535535 | 614 | 546423 | 664 | 554466 | 714 |
| 453565 | 515 | 465553 | 565 | 536524 | 615 | 546434 | 665 | 554533 | 715 |
| 454332 | 516 | 465564 | 566 | 536624 | 616 | 546523 | 666 | 554544 | 716 |
| 454343 | 517 | 465653 | 567 | 542223 | 617 | 546534 | 667 | 554555 | 717 |
| 454354 | 518 | 466442 | 568 | 542234 | 618 | 546623 | 668 | 554644 | 718 |
| 454365 | 519 | 466453 | 569 | 542245 | 619 | 546634 | 669 | 555222 | 719 |
| 454432 | 520 | 466542 | 570 | 542256 | 620 | 547623 | 670 | 555233 | 720 |
| 454443 | 521 | 466553 | 571 | 542334 | 621 | 552233 | 671 | 555244 | 721 |
| 454454 | 522 | 466642 | 572 | 542345 | 622 | 552244 | 672 | 555255 | 722 |
| 454465 | 523 | 466653 | 573 | 542356 | 623 | 552255 | 673 | 555322 | 723 |
| 454476 | 524 | 467642 | 574 | 542367 | 624 | 552266 | 674 | 555333 | 724 |
| 454543 | 525 | 475552 | 575 | 542445 | 625 | 552277 | 675 | 555344 | 725 |
| 454554 | 526 | 476552 | 576 | 542456 | 626 | 552333 | 676 | 555355 | 726 |
| 454565 | 527 | 522225 | 577 | 543223 | 627 | 552344 | 677 | 555422 | 727 |
| 454654 | 528 | 522236 | 578 | 543234 | 628 | 552355 | 678 | 555433 | 728 |
| 455332 | 529 | 522247 | 579 | 543245 | 629 | 552366 | 679 | 555444 | 729 |
| 455343 | 530 | 522336 | 580 | 543256 | 630 | 552444 | 680 | 555455 | 730 |
| 455354 | 531 | 523325 | 581 | 543323 | 631 | 552455 | 681 | 555522 | 731 |
| 455365 | 532 | 523336 | 582 | 543334 | 632 | 552466 | 682 | 555533 | 732 |
| 455432 | 533 | 523347 | 583 | 543345 | 633 | 552555 | 683 | 555544 | 733 |
| 455443 | 534 | 523436 | 584 | 543356 | 634 | 553222 | 684 | 555555 | 734 |
| 455454 | 535 | 524425 | 585 | 543367 | 635 | 553233 | 685 | 555633 | 735 |
| 455465 | 536 | 524436 | 586 | 543434 | 636 | 553244 | 686 | 555644 | 736 |
| 455532 | 537 | 525525 | 587 | 543445 | 637 | 553255 | 687 | 556322 | 737 |
| 455543 | 538 | 532224 | 588 | 543456 | 638 | 553266 | 688 | 556333 | 738 |
| 455554 | 539 | 532235 | 589 | 543545 | 639 | 553322 | 689 | 556344 | 739 |
| 455565 | 540 | 532246 | 590 | 544223 | 640 | 553333 | 690 | 556422 | 740 |
| 455643 | 541 | 532257 | 591 | 544234 | 641 | 553344 | 691 | 556433 | 741 |
| 455654 | 542 | 532335 | 592 | 544245 | 642 | 553355 | 692 | 556444 | 742 |
| 456432 | 543 | 532346 | 593 | 544256 | 643 | 553366 | 693 | 556522 | 743 |
| 456443 | 544 | 532357 | 594 | 544323 | 644 | 553433 | 694 | 556533 | 744 |
| 456454 | 545 | 532446 | 595 | 544334 | 645 | 553444 | 695 | 556544 | 745 |
| 456532 | 546 | 533224 | 596 | 544345 | 646 | 553455 | 696 | 556622 | 746 |
| 456543 | 547 | 533235 | 597 | 544356 | 647 | 553466 | 697 | 556633 | 747 |
| 456554 | 548 | 533246 | 598 | 544423 | 648 | 553544 | 698 | 556644 | 748 |
| 456632 | 549 | 533324 | 599 | 544434 | 649 | 553555 | 699 | 557422 | 749 |

FIG. 14C

| Table I : The t-sequence table. Cluster0 ||||||||||
|---|---|---|---|---|---|---|---|---|---|
| t-seq | val | t-seq | val | t-seq | val | t-seq | val | t-seq | val |
| 557522 | 750 | 632225 | 800 | 654223 | 850 | 664244 | 900 | | |
| 557622 | 751 | 632236 | 801 | 654234 | 851 | 664255 | 901 | | |
| 555722 | 752 | 632247 | 802 | 654245 | 852 | 664322 | 902 | | |
| 563332 | 753 | 632336 | 803 | 654323 | 853 | 664333 | 903 | | |
| 563343 | 754 | 633225 | 804 | 654334 | 854 | 664344 | 904 | | |
| 563354 | 755 | 633236 | 805 | 654345 | 855 | 664355 | 905 | | |
| 563365 | 756 | 633325 | 806 | 654423 | 856 | 664422 | 906 | | |
| 563443 | 757 | 633336 | 807 | 654434 | 857 | 664433 | 907 | | |
| 563454 | 758 | 634325 | 808 | 654445 | 858 | 664444 | 908 | | |
| 563465 | 759 | 634425 | 809 | 654534 | 859 | 664455 | 909 | | |
| 563554 | 760 | 642224 | 810 | 655223 | 860 | 664533 | 910 | | |
| 564332 | 761 | 642235 | 811 | 655234 | 861 | 664544 | 911 | | |
| 564343 | 762 | 642246 | 812 | 655323 | 862 | 665222 | 912 | | |
| 564354 | 763 | 642335 | 813 | 655334 | 863 | 665233 | 913 | | |
| 564365 | 764 | 642346 | 814 | 655423 | 864 | 665244 | 914 | | |
| 564432 | 765 | 643224 | 815 | 655434 | 865 | 665322 | 915 | | |
| 564443 | 766 | 643235 | 816 | 655523 | 866 | 665333 | 916 | | |
| 564454 | 767 | 643246 | 817 | 655534 | 867 | 665344 | 917 | | |
| 564465 | 768 | 643324 | 818 | 656323 | 868 | 665422 | 918 | | |
| 564543 | 769 | 643335 | 819 | 656423 | 869 | 665433 | 919 | | |
| 564554 | 770 | 643346 | 820 | 656523 | 870 | 665444 | 920 | | |
| 565332 | 771 | 643435 | 821 | 656623 | 871 | 665522 | 921 | | |
| 565343 | 772 | 644224 | 822 | 662222 | 872 | 665533 | 922 | | |
| 565354 | 773 | 644235 | 823 | 662233 | 873 | 665544 | 923 | | |
| 565432 | 774 | 644324 | 824 | 662244 | 874 | 665633 | 924 | | |
| 565443 | 775 | 644335 | 825 | 662255 | 875 | 666222 | 925 | | |
| 565454 | 776 | 644424 | 826 | 662266 | 876 | 666233 | 926 | | |
| 565532 | 777 | 644435 | 827 | 662277 | 877 | 666322 | 927 | | |
| 565543 | 778 | 645324 | 828 | 662333 | 878 | 666333 | 928 | | |
| 565554 | 779 | 645424 | 829 | 662344 | 879 | | | | |
| 565643 | 780 | 645524 | 830 | 662355 | 880 | | | | |
| 566332 | 781 | 652223 | 831 | 662366 | 881 | | | | |
| 566343 | 782 | 652234 | 832 | 662444 | 882 | | | | |
| 566432 | 783 | 652245 | 833 | 662455 | 883 | | | | |
| 566443 | 784 | 652256 | 834 | 663222 | 884 | | | | |
| 566532 | 785 | 652267 | 835 | 663233 | 885 | | | | |
| 566543 | 786 | 652334 | 836 | 663244 | 886 | | | | |
| 566632 | 787 | 652345 | 837 | 663255 | 887 | | | | |
| 566643 | 788 | 652356 | 838 | 663266 | 888 | | | | |
| 567432 | 789 | 652445 | 839 | 663322 | 889 | | | | |
| 567632 | 790 | 653223 | 840 | 663333 | 890 | | | | |
| 574442 | 791 | 653234 | 841 | 663344 | 891 | | | | |
| 574464 | 792 | 653245 | 842 | 663355 | 892 | | | | |
| 575442 | 793 | 653256 | 843 | 663366 | 893 | | | | |
| 575542 | 794 | 653323 | 844 | 663433 | 894 | | | | |
| 576442 | 795 | 653334 | 845 | 663444 | 895 | | | | |
| 576642 | 796 | 653345 | 846 | 663455 | 896 | | | | |
| 622226 | 797 | 653356 | 847 | 663544 | 897 | | | | |
| 622772 | 798 | 653434 | 848 | 664222 | 898 | | | | |
| 623326 | 799 | 653445 | 849 | 664233 | 899 | | | | |

FIG. 14D

| Table I : The t-sequence table. Cluster3 ||||||||||
|---|---|---|---|---|---|---|---|---|---|
| t-seq | val | t-seq | val | t-seq | val | t-seq | val | t-seq | val |
| 222563 | 0 | 234327 | 50 | 266224 | 100 | 323775 | 150 | 334685 | 200 |
| 222574 | 1 | 234338 | 51 | 266235 | 101 | 324642 | 151 | 334752 | 201 |
| 222585 | 2 | 234349 | 52 | 266246 | 102 | 324653 | 152 | 334763 | 202 |
| 222596 | 3 | 234762 | 53 | 266257 | 103 | 324664 | 153 | 334774 | 203 |
| 222663 | 4 | 234773 | 54 | 266335 | 104 | 324675 | 154 | 334785 | 204 |
| 222674 | 5 | 234784 | 55 | 266346 | 105 | 324686 | 155 | 334863 | 205 |
| 222685 | 6 | 234795 | 56 | 267324 | 106 | 324753 | 156 | 334874 | 206 |
| 222696 | 7 | 234873 | 57 | 267335 | 107 | 324764 | 157 | 335752 | 207 |
| 222774 | 8 | 234884 | 58 | 267346 | 108 | 324775 | 158 | 335763 | 208 |
| 222785 | 9 | 235427 | 59 | 267435 | 109 | 324864 | 159 | 335774 | 209 |
| 222796 | 10 | 235438 | 60 | 268424 | 110 | 325742 | 160 | 335852 | 210 |
| 223652 | 11 | 235862 | 61 | 268435 | 111 | 325753 | 161 | 335863 | 211 |
| 223663 | 12 | 235873 | 62 | 269524 | 112 | 325764 | 162 | 335874 | 212 |
| 223674 | 13 | 235884 | 63 | 277223 | 113 | 325775 | 163 | 335963 | 213 |
| 223685 | 14 | 235973 | 64 | 277234 | 114 | 325853 | 164 | 336852 | 214 |
| 223696 | 15 | 236527 | 65 | 277245 | 115 | 325864 | 165 | 336863 | 215 |
| 223763 | 16 | 236962 | 66 | 277256 | 116 | 326842 | 166 | 336952 | 216 |
| 223774 | 17 | 236973 | 67 | 277334 | 117 | 326853 | 167 | 336963 | 217 |
| 223785 | 18 | 244226 | 68 | 277345 | 118 | 326864 | 168 | 337952 | 218 |
| 223796 | 19 | 244237 | 69 | 278323 | 119 | 326953 | 169 | 343227 | 219 |
| 223874 | 20 | 244248 | 70 | 278334 | 120 | 327942 | 170 | 343238 | 220 |
| 223885 | 21 | 244259 | 71 | 278345 | 121 | 327953 | 171 | 343249 | 221 |
| 224752 | 22 | 244337 | 72 | 278434 | 122 | 332552 | 172 | 343662 | 222 |
| 224763 | 23 | 244348 | 73 | 279423 | 123 | 332563 | 173 | 343673 | 223 |
| 224774 | 24 | 244772 | 74 | 279434 | 124 | 332574 | 174 | 343684 | 224 |
| 224785 | 25 | 244783 | 75 | 322453 | 125 | 332585 | 175 | 343695 | 225 |
| 224796 | 26 | 244794 | 76 | 322464 | 126 | 332596 | 176 | 343773 | 226 |
| 224863 | 27 | 245326 | 77 | 322475 | 127 | 332663 | 177 | 343784 | 227 |
| 224874 | 28 | 245337 | 78 | 322486 | 128 | 332674 | 178 | 344227 | 228 |
| 224885 | 29 | 245348 | 79 | 322497 | 129 | 332685 | 179 | 344238 | 229 |
| 224974 | 30 | 245437 | 80 | 322553 | 130 | 332696 | 180 | 344327 | 230 |
| 225852 | 31 | 245872 | 81 | 322564 | 131 | 332774 | 181 | 344338 | 231 |
| 225863 | 32 | 245883 | 82 | 322575 | 132 | 332785 | 182 | 344662 | 232 |
| 225874 | 33 | 246426 | 83 | 322586 | 133 | 333552 | 183 | 344673 | 233 |
| 225885 | 34 | 246437 | 84 | 322597 | 134 | 333563 | 184 | 344684 | 234 |
| 225963 | 35 | 246972 | 85 | 322664 | 135 | 333574 | 185 | 344762 | 235 |
| 225974 | 36 | 247526 | 86 | 322675 | 136 | 333585 | 186 | 344773 | 236 |
| 226952 | 37 | 255225 | 87 | 322686 | 137 | 333596 | 187 | 344784 | 237 |
| 226963 | 38 | 255236 | 88 | 322775 | 138 | 333652 | 188 | 344873 | 238 |
| 226974 | 39 | 255247 | 89 | 323542 | 139 | 333663 | 189 | 345327 | 239 |
| 233227 | 40 | 255258 | 90 | 323553 | 140 | 333674 | 190 | 345427 | 240 |
| 233238 | 41 | 255336 | 91 | 323564 | 141 | 333685 | 191 | 345762 | 241 |
| 233249 | 42 | 255347 | 92 | 323575 | 142 | 333696 | 192 | 345773 | 242 |
| 233662 | 43 | 256325 | 93 | 323586 | 143 | 333763 | 193 | 345862 | 243 |
| 233673 | 44 | 256336 | 94 | 323597 | 144 | 333774 | 194 | 345873 | 244 |
| 233684 | 45 | 256347 | 95 | 323653 | 145 | 333785 | 195 | 346862 | 245 |
| 233695 | 46 | 256436 | 96 | 323664 | 146 | 333874 | 196 | 346962 | 246 |
| 233773 | 47 | 257425 | 97 | 323675 | 147 | 334652 | 197 | 354226 | 247 |
| 233784 | 48 | 257436 | 98 | 323686 | 148 | 334663 | 198 | 354237 | 248 |
| 233795 | 49 | 258525 | 99 | 323764 | 149 | 334674 | 199 | 354248 | 249 |

FIG. 15A

| Table I : The t-sequence table. Cluster3 ||||||||||
|---|---|---|---|---|---|---|---|---|---|
| t-seq | val | t-seq | val | t-seq | val | t-seq | val | t-seq | val |
| 354337 | 250 | 422576 | 300 | 433475 | 350 | 443685 | 400 | 497223 | 450 |
| 354772 | 251 | 422665 | 301 | 433486 | 351 | 443763 | 401 | 497234 | 451 |
| 354783 | 252 | 423432 | 302 | 433542 | 352 | 443774 | 402 | 498323 | 452 |
| 355226 | 253 | 423443 | 303 | 433553 | 353 | 444552 | 403 | 522233 | 453 |
| 355237 | 254 | 423454 | 304 | 433564 | 354 | 444563 | 404 | 522244 | 454 |
| 355326 | 255 | 423465 | 305 | 433575 | 355 | 444574 | 405 | 522255 | 455 |
| 355337 | 256 | 423476 | 306 | 433586 | 356 | 444652 | 406 | 522266 | 456 |
| 355772 | 257 | 423487 | 307 | 433653 | 357 | 444663 | 407 | 522277 | 457 |
| 355872 | 258 | 423543 | 308 | 433664 | 358 | 444674 | 408 | 522333 | 458 |
| 356326 | 259 | 423554 | 309 | 433675 | 359 | 444752 | 409 | 522344 | 459 |
| 356426 | 260 | 423565 | 310 | 433764 | 360 | 444763 | 410 | 522355 | 460 |
| 365225 | 261 | 423576 | 311 | 434542 | 361 | 444774 | 411 | 522366 | 461 |
| 365236 | 262 | 423654 | 312 | 434553 | 362 | 444863 | 412 | 522377 | 462 |
| 365247 | 263 | 423665 | 313 | 434564 | 363 | 445652 | 413 | 522444 | 463 |
| 365336 | 264 | 424532 | 314 | 434575 | 364 | 445663 | 414 | 522455 | 464 |
| 366225 | 265 | 424543 | 315 | 434642 | 365 | 445752 | 415 | 522466 | 465 |
| 366236 | 266 | 424554 | 316 | 434653 | 366 | 445763 | 416 | 522555 | 466 |
| 366325 | 267 | 424565 | 317 | 434664 | 367 | 445852 | 417 | 523322 | 467 |
| 366336 | 268 | 424576 | 318 | 434675 | 368 | 445863 | 418 | 523333 | 468 |
| 367325 | 269 | 424643 | 319 | 434753 | 369 | 446752 | 419 | 523344 | 469 |
| 367425 | 270 | 424654 | 320 | 434764 | 370 | 446852 | 420 | 523355 | 470 |
| 376224 | 271 | 424665 | 321 | 435642 | 371 | 446952 | 421 | 523366 | 471 |
| 376235 | 272 | 424754 | 322 | 435653 | 372 | 453227 | 422 | 523377 | 472 |
| 376246 | 273 | 425632 | 323 | 435664 | 373 | 453238 | 423 | 523433 | 473 |
| 376335 | 274 | 425643 | 324 | 435742 | 374 | 453662 | 424 | 523444 | 474 |
| 377224 | 275 | 425654 | 325 | 435753 | 375 | 453673 | 425 | 523455 | 475 |
| 377235 | 276 | 425665 | 326 | 435764 | 376 | 453684 | 426 | 523466 | 476 |
| 377324 | 277 | 425743 | 327 | 435853 | 377 | 453773 | 427 | 523544 | 477 |
| 377335 | 278 | 425754 | 328 | 436742 | 378 | 454227 | 428 | 523555 | 478 |
| 378324 | 279 | 426732 | 329 | 436753 | 379 | 454327 | 429 | 524422 | 479 |
| 378424 | 280 | 426743 | 330 | 436842 | 380 | 454662 | 430 | 524433 | 480 |
| 387223 | 281 | 426754 | 331 | 436853 | 381 | 454673 | 431 | 524444 | 481 |
| 387234 | 282 | 426843 | 332 | 437842 | 382 | 454762 | 432 | 524455 | 482 |
| 387245 | 283 | 427832 | 333 | 437942 | 383 | 454773 | 433 | 524466 | 483 |
| 387334 | 284 | 427843 | 334 | 442552 | 384 | 455662 | 434 | 524533 | 484 |
| 388323 | 285 | 432442 | 335 | 442563 | 385 | 455762 | 435 | 524544 | 485 |
| 388334 | 286 | 432453 | 336 | 442574 | 386 | 455862 | 436 | 524555 | 486 |
| 389423 | 287 | 432464 | 337 | 442585 | 387 | 464226 | 437 | 524644 | 487 |
| 422343 | 288 | 432475 | 338 | 442596 | 388 | 464237 | 438 | 525522 | 488 |
| 422354 | 289 | 432486 | 339 | 442663 | 389 | 464772 | 439 | 525533 | 489 |
| 422365 | 290 | 432497 | 340 | 442674 | 390 | 465226 | 440 | 525544 | 490 |
| 422376 | 291 | 432553 | 341 | 442685 | 391 | 465326 | 441 | 525555 | 491 |
| 422387 | 292 | 432564 | 342 | 442774 | 392 | 475225 | 442 | 525633 | 492 |
| 422443 | 293 | 432575 | 343 | 443552 | 393 | 475236 | 443 | 525644 | 493 |
| 422454 | 294 | 432586 | 344 | 443563 | 394 | 476225 | 444 | 526622 | 494 |
| 422465 | 295 | 432664 | 345 | 443574 | 395 | 476325 | 445 | 526633 | 495 |
| 422476 | 296 | 432675 | 346 | 443585 | 396 | 486224 | 446 | 526644 | 496 |
| 422487 | 297 | 433442 | 347 | 443652 | 397 | 486235 | 447 | 526733 | 497 |
| 422554 | 298 | 433453 | 348 | 443663 | 398 | 487224 | 448 | 527722 | 498 |
| 422565 | 299 | 433464 | 349 | 443674 | 399 | 487324 | 449 | 527733 | 499 |

FIG. 15B

| Table I : The t-sequence table. Cluster3 ||||||||||
|---|---|---|---|---|---|---|---|---|---|
| t-seq | val | t-seq | val | t-seq | val | t-seq | val | t-seq | val |
| 532332 | 500 | 542453 | 550 | 554552 | 600 | 632444 | 650 | 643354 | 700 |
| 532343 | 501 | 542464 | 551 | 554563 | 601 | 632455 | 651 | 643365 | 701 |
| 532354 | 502 | 542475 | 552 | 554652 | 602 | 633222 | 652 | 643432 | 702 |
| 532365 | 503 | 542486 | 553 | 554663 | 603 | 633233 | 653 | 643443 | 703 |
| 532376 | 504 | 542553 | 554 | 554752 | 604 | 633244 | 654 | 643454 | 704 |
| 532387 | 505 | 542564 | 555 | 554763 | 605 | 633255 | 655 | 643465 | 705 |
| 532443 | 506 | 542575 | 556 | 555552 | 606 | 633266 | 656 | 643543 | 706 |
| 532454 | 507 | 542664 | 557 | 555652 | 607 | 633322 | 657 | 643554 | 707 |
| 532465 | 508 | 543442 | 558 | 555752 | 608 | 633333 | 658 | 644332 | 708 |
| 532476 | 509 | 543453 | 559 | 555852 | 609 | 633344 | 659 | 644343 | 709 |
| 532554 | 510 | 543464 | 560 | 563227 | 610 | 633355 | 660 | 644354 | 710 |
| 532565 | 511 | 543475 | 561 | 563662 | 611 | 633366 | 661 | 644432 | 711 |
| 533332 | 512 | 543542 | 562 | 563673 | 612 | 633433 | 662 | 644443 | 712 |
| 533343 | 513 | 543553 | 563 | 564662 | 613 | 633444 | 663 | 644454 | 713 |
| 533354 | 514 | 543564 | 564 | 564762 | 614 | 633455 | 664 | 644532 | 714 |
| 533365 | 515 | 543575 | 565 | 574226 | 615 | 633544 | 665 | 644543 | 715 |
| 533376 | 516 | 543653 | 566 | 585225 | 616 | 634322 | 666 | 644554 | 716 |
| 533432 | 517 | 543664 | 567 | 596224 | 617 | 634333 | 667 | 644643 | 717 |
| 533443 | 518 | 544442 | 568 | 622223 | 618 | 634344 | 668 | 645432 | 718 |
| 533454 | 519 | 544453 | 569 | 622234 | 619 | 634355 | 669 | 645443 | 719 |
| 533465 | 520 | 544464 | 570 | 622245 | 620 | 634422 | 670 | 645532 | 720 |
| 533476 | 521 | 544542 | 571 | 622256 | 621 | 634433 | 671 | 645543 | 721 |
| 533543 | 522 | 544553 | 572 | 622267 | 622 | 634444 | 672 | 645632 | 722 |
| 533554 | 523 | 544564 | 573 | 622334 | 623 | 634455 | 673 | 645643 | 723 |
| 533565 | 524 | 544642 | 574 | 622345 | 624 | 634533 | 674 | 646532 | 724 |
| 533654 | 525 | 544653 | 575 | 622356 | 625 | 634544 | 675 | 646632 | 725 |
| 534432 | 526 | 544664 | 576 | 622445 | 626 | 635422 | 676 | 646732 | 726 |
| 534443 | 527 | 544753 | 577 | 623323 | 627 | 635433 | 677 | 652442 | 727 |
| 534454 | 528 | 545542 | 578 | 623334 | 628 | 635444 | 678 | 652453 | 728 |
| 534465 | 529 | 545553 | 579 | 623345 | 629 | 635522 | 679 | 652464 | 729 |
| 534532 | 530 | 545642 | 580 | 623356 | 630 | 635533 | 680 | 652475 | 730 |
| 534543 | 531 | 545653 | 581 | 623434 | 631 | 635544 | 681 | 652553 | 731 |
| 534554 | 532 | 545742 | 582 | 623445 | 632 | 635633 | 682 | 652564 | 732 |
| 534565 | 533 | 545753 | 583 | 624423 | 633 | 636522 | 683 | 653442 | 733 |
| 534643 | 534 | 546642 | 584 | 624434 | 634 | 636533 | 684 | 653453 | 734 |
| 534654 | 535 | 546742 | 585 | 624445 | 635 | 636622 | 685 | 653464 | 735 |
| 535532 | 536 | 546842 | 586 | 624534 | 636 | 636633 | 686 | 653542 | 736 |
| 535543 | 537 | 552552 | 587 | 625523 | 637 | 637622 | 687 | 653553 | 737 |
| 535554 | 538 | 552563 | 588 | 625534 | 638 | 637722 | 688 | 653564 | 738 |
| 535632 | 539 | 552574 | 589 | 626623 | 639 | 642332 | 689 | 653653 | 739 |
| 535643 | 540 | 552585 | 590 | 632222 | 640 | 642343 | 690 | 654442 | 740 |
| 535654 | 541 | 552663 | 591 | 632233 | 641 | 642354 | 691 | 654453 | 741 |
| 535743 | 542 | 552674 | 592 | 632244 | 642 | 642365 | 692 | 654542 | 742 |
| 536632 | 543 | 553552 | 593 | 632255 | 643 | 642376 | 693 | 654553 | 743 |
| 536643 | 544 | 553563 | 594 | 632266 | 644 | 642443 | 694 | 654642 | 744 |
| 536732 | 545 | 553574 | 595 | 632277 | 645 | 642454 | 695 | 654653 | 745 |
| 536743 | 546 | 553652 | 596 | 632333 | 646 | 642465 | 696 | 655442 | 746 |
| 537732 | 547 | 553663 | 597 | 632344 | 647 | 642554 | 697 | 655542 | 747 |
| 537832 | 548 | 553674 | 598 | 632355 | 648 | 643332 | 698 | 655642 | 748 |
| 542442 | 549 | 553763 | 599 | 632366 | 649 | 643343 | 699 | 655742 | 749 |

FIG. 15C

| Table I : The t-sequence table. Cluster3 ||||||||||
|---|---|---|---|---|---|---|---|---|---|
| t-seq | val | t-seq | val | t-seq | val | t-seq | val | t-seq | val |
| 662552 | 750 | 743255 | 800 | 762453 | 850 | 862343 | 900 | | |
| 662563 | 751 | 743322 | 801 | 762464 | 851 | 862354 | 901 | | |
| 662574 | 752 | 743333 | 802 | 762553 | 852 | 862443 | 902 | | |
| 662663 | 753 | 743344 | 803 | 763442 | 853 | 863332 | 903 | | |
| 663552 | 754 | 743355 | 804 | 763453 | 854 | 863343 | 904 | | |
| 663563 | 755 | 743433 | 805 | 763542 | 855 | 863432 | 905 | | |
| 663652 | 756 | 743444 | 806 | 763553 | 856 | 863443 | 906 | | |
| 663663 | 757 | 744222 | 807 | 764442 | 857 | 864332 | 907 | | |
| 664552 | 758 | 744233 | 808 | 764542 | 858 | 864432 | 908 | | |
| 664652 | 759 | 744244 | 809 | 764642 | 859 | 864532 | 909 | | |
| 664752 | 760 | 744322 | 810 | 772552 | 860 | 872442 | 910 | | |
| 673662 | 761 | 744333 | 811 | 772563 | 861 | 872453 | 911 | | |
| 722224 | 762 | 744344 | 812 | 773552 | 862 | 873442 | 912 | | |
| 722235 | 763 | 744422 | 813 | 773652 | 863 | 873542 | 913 | | |
| 722246 | 764 | 744433 | 814 | 832224 | 864 | 942224 | 914 | | |
| 722335 | 765 | 744444 | 815 | 832235 | 865 | 952223 | 915 | | |
| 723324 | 766 | 744533 | 816 | 833324 | 866 | 952234 | 916 | | |
| 723335 | 767 | 745322 | 817 | 842223 | 867 | 953223 | 917 | | |
| 724424 | 768 | 745333 | 818 | 842234 | 868 | 953323 | 918 | | |
| 732223 | 769 | 745422 | 819 | 842245 | 869 | 962222 | 919 | | |
| 732234 | 770 | 745433 | 820 | 842334 | 870 | 962233 | 920 | | |
| 732245 | 771 | 745522 | 821 | 843223 | 871 | 962244 | 921 | | |
| 732256 | 772 | 745533 | 822 | 843234 | 872 | 962333 | 922 | | |
| 732334 | 773 | 746422 | 823 | 843323 | 873 | 963222 | 923 | | |
| 732345 | 774 | 746522 | 824 | 843334 | 874 | 963233 | 924 | | |
| 733223 | 775 | 746622 | 825 | 844323 | 875 | 963322 | 925 | | |
| 733234 | 776 | 752332 | 826 | 844423 | 876 | 963333 | 926 | | |
| 733245 | 777 | 752343 | 827 | 852222 | 877 | 964222 | 927 | | |
| 733323 | 778 | 752354 | 828 | 852233 | 878 | 964322 | 928 | | |
| 733334 | 779 | 752365 | 829 | 852244 | 879 | | | | |
| 733345 | 780 | 752443 | 830 | 852255 | 880 | | | | |
| 733434 | 781 | 752454 | 831 | 852333 | 881 | | | | |
| 734323 | 782 | 753332 | 832 | 852344 | 882 | | | | |
| 734334 | 783 | 753343 | 833 | 853222 | 883 | | | | |
| 734423 | 784 | 753354 | 834 | 853233 | 884 | | | | |
| 734434 | 785 | 753432 | 835 | 853244 | 885 | | | | |
| 735423 | 786 | 753443 | 836 | 853322 | 886 | | | | |
| 735523 | 787 | 753454 | 837 | 853333 | 887 | | | | |
| 742222 | 788 | 753543 | 838 | 853344 | 888 | | | | |
| 742233 | 789 | 754332 | 839 | 853433 | 889 | | | | |
| 742244 | 790 | 754343 | 840 | 854222 | 890 | | | | |
| 742255 | 791 | 754432 | 841 | 854233 | 891 | | | | |
| 742266 | 792 | 754443 | 842 | 854322 | 892 | | | | |
| 742333 | 793 | 754532 | 843 | 854333 | 893 | | | | |
| 742344 | 794 | 754543 | 844 | 854422 | 894 | | | | |
| 742355 | 795 | 755332 | 845 | 854433 | 895 | | | | |
| 742444 | 796 | 755432 | 846 | 855322 | 896 | | | | |
| 743222 | 797 | 755532 | 847 | 855422 | 897 | | | | |
| 743233 | 798 | 755632 | 848 | 855522 | 898 | | | | |
| 743244 | 799 | 762442 | 849 | 862332 | 899 | | | | |

FIG. 15D

| Table I : The t-sequence table. Cluster6 ||||||||||
|---|---|---|---|---|---|---|---|---|---|
| t-seq | val | t-seq | val | t-seq | val | t-seq | val | t-seq | val |
| 222236 | 0 | 233357 | 50 | 244445 | 100 | 255555 | 150 | 268643 | 200 |
| 222247 | 1 | 233368 | 51 | 244456 | 101 | 256322 | 151 | 269632 | 201 |
| 222258 | 2 | 233379 | 52 | 244467 | 102 | 256333 | 152 | 269643 | 202 |
| 222269 | 3 | 233446 | 53 | 244556 | 103 | 256344 | 153 | 277442 | 203 |
| 222336 | 4 | 233457 | 54 | 245323 | 104 | 256355 | 154 | 277453 | 204 |
| 222347 | 5 | 233468 | 55 | 245334 | 105 | 256366 | 155 | 277464 | 205 |
| 222358 | 6 | 233557 | 56 | 245345 | 106 | 256377 | 156 | 277553 | 206 |
| 222369 | 7 | 234324 | 57 | 245356 | 107 | 256433 | 157 | 278542 | 207 |
| 222447 | 8 | 234335 | 58 | 245367 | 108 | 256444 | 158 | 278553 | 208 |
| 222458 | 9 | 234346 | 59 | 245378 | 109 | 256455 | 159 | 279642 | 209 |
| 222469 | 10 | 234357 | 60 | 245434 | 110 | 256466 | 160 | 322226 | 210 |
| 223325 | 11 | 234368 | 61 | 245445 | 111 | 256544 | 161 | 322237 | 211 |
| 223336 | 12 | 234379 | 62 | 245456 | 112 | 256555 | 162 | 322248 | 212 |
| 223347 | 13 | 234435 | 63 | 245467 | 113 | 257422 | 163 | 322259 | 213 |
| 223358 | 14 | 234446 | 64 | 245545 | 114 | 257433 | 164 | 322337 | 214 |
| 223369 | 15 | 234457 | 65 | 245556 | 115 | 257444 | 165 | 322348 | 215 |
| 223436 | 16 | 234468 | 66 | 246423 | 116 | 257455 | 166 | 322359 | 216 |
| 223447 | 17 | 234546 | 67 | 246434 | 117 | 257466 | 167 | 322772 | 217 |
| 223458 | 18 | 234557 | 68 | 246445 | 118 | 257533 | 168 | 322783 | 218 |
| 223469 | 19 | 235424 | 69 | 246456 | 119 | 257544 | 169 | 322794 | 219 |
| 223547 | 20 | 235435 | 70 | 246467 | 120 | 257555 | 170 | 323326 | 220 |
| 223558 | 21 | 235446 | 71 | 246534 | 121 | 257644 | 171 | 323337 | 221 |
| 224425 | 22 | 235457 | 72 | 246545 | 122 | 258522 | 172 | 323348 | 222 |
| 224436 | 23 | 235468 | 73 | 246556 | 123 | 258533 | 173 | 323359 | 223 |
| 224447 | 24 | 235535 | 74 | 246645 | 124 | 258544 | 174 | 323437 | 224 |
| 224458 | 25 | 235546 | 75 | 247523 | 125 | 258555 | 175 | 323448 | 225 |
| 224469 | 26 | 235557 | 76 | 247534 | 126 | 258633 | 176 | 323872 | 226 |
| 224536 | 27 | 235646 | 77 | 247545 | 127 | 258644 | 177 | 323883 | 227 |
| 224547 | 28 | 236524 | 78 | 247556 | 128 | 259622 | 178 | 323894 | 228 |
| 224558 | 29 | 236535 | 79 | 247634 | 129 | 259633 | 179 | 324426 | 229 |
| 224647 | 30 | 236546 | 80 | 247645 | 130 | 259644 | 180 | 324437 | 230 |
| 225525 | 31 | 236557 | 81 | 248623 | 131 | 259733 | 181 | 324448 | 231 |
| 225536 | 32 | 236635 | 82 | 248634 | 132 | 266332 | 182 | 324537 | 232 |
| 225547 | 33 | 236646 | 83 | 248645 | 133 | 266343 | 183 | 324972 | 233 |
| 225558 | 34 | 237624 | 84 | 248734 | 134 | 266354 | 184 | 324983 | 234 |
| 225636 | 35 | 237635 | 85 | 249723 | 135 | 266365 | 185 | 325526 | 235 |
| 225647 | 36 | 237646 | 86 | 249734 | 136 | 266376 | 186 | 325537 | 236 |
| 226625 | 37 | 237735 | 87 | 255233 | 137 | 266443 | 187 | 326626 | 237 |
| 226636 | 38 | 238724 | 88 | 255244 | 138 | 266454 | 188 | 332225 | 238 |
| 226647 | 39 | 238735 | 89 | 255255 | 139 | 266465 | 189 | 332236 | 239 |
| 226736 | 40 | 244234 | 90 | 255266 | 140 | 266554 | 190 | 332247 | 240 |
| 227725 | 41 | 244245 | 91 | 255277 | 141 | 267432 | 191 | 332258 | 241 |
| 227736 | 42 | 244256 | 92 | 255333 | 142 | 267443 | 192 | 332269 | 242 |
| 233235 | 43 | 244267 | 93 | 255344 | 143 | 267454 | 193 | 332336 | 243 |
| 233246 | 44 | 244278 | 94 | 255355 | 144 | 267465 | 194 | 332347 | 244 |
| 233257 | 45 | 244334 | 95 | 255366 | 145 | 267543 | 195 | 332358 | 245 |
| 233268 | 46 | 244345 | 96 | 255377 | 146 | 267554 | 196 | 332369 | 246 |
| 233279 | 47 | 244356 | 97 | 255444 | 147 | 268532 | 197 | 332447 | 247 |
| 233335 | 48 | 244367 | 98 | 255455 | 148 | 268543 | 198 | 332458 | 248 |
| 233346 | 49 | 244378 | 99 | 255466 | 149 | 268554 | 199 | 333225 | 249 |

FIG. 16A

| Table I : The t-sequence table. Cluster6 ||||||||||
|---|---|---|---|---|---|---|---|---|---|
| t-seq | val | t-seq | val | t-seq | val | t-seq | val | t-seq | val |
| 333236 | 250 | 344246 | 300 | 355256 | 350 | 366266 | 400 | 387442 | 450 |
| 333247 | 251 | 344257 | 301 | 355267 | 351 | 366322 | 401 | 387453 | 451 |
| 333258 | 252 | 344268 | 302 | 355323 | 352 | 366333 | 402 | 388542 | 452 |
| 333269 | 253 | 344324 | 303 | 355334 | 353 | 366344 | 403 | 422227 | 453 |
| 333325 | 254 | 344335 | 304 | 355345 | 354 | 366355 | 404 | 422238 | 454 |
| 333336 | 255 | 344346 | 305 | 355356 | 355 | 366366 | 405 | 422249 | 455 |
| 333347 | 256 | 344357 | 306 | 355367 | 356 | 366433 | 406 | 422662 | 456 |
| 333358 | 257 | 344368 | 307 | 355434 | 357 | 366444 | 407 | 422673 | 457 |
| 333369 | 258 | 344435 | 308 | 355445 | 358 | 366455 | 408 | 422684 | 458 |
| 333436 | 259 | 344446 | 309 | 355456 | 359 | 366544 | 409 | 422695 | 459 |
| 333447 | 260 | 344457 | 310 | 355545 | 360 | 367322 | 410 | 422773 | 460 |
| 333458 | 261 | 344546 | 311 | 356323 | 361 | 367333 | 411 | 422784 | 461 |
| 333547 | 262 | 345324 | 312 | 356334 | 362 | 367344 | 412 | 423327 | 462 |
| 334325 | 263 | 345335 | 313 | 356345 | 363 | 367355 | 413 | 423338 | 463 |
| 334336 | 264 | 345346 | 314 | 356356 | 364 | 367422 | 414 | 423762 | 464 |
| 334347 | 265 | 345357 | 315 | 356423 | 365 | 367433 | 415 | 423773 | 465 |
| 334358 | 266 | 345424 | 316 | 356434 | 366 | 367444 | 416 | 423784 | 466 |
| 334425 | 267 | 345435 | 317 | 356445 | 367 | 367455 | 417 | 423873 | 467 |
| 334436 | 268 | 345446 | 318 | 356456 | 368 | 367533 | 418 | 424427 | 468 |
| 334447 | 269 | 345457 | 319 | 356534 | 369 | 367544 | 419 | 424862 | 469 |
| 334458 | 270 | 345535 | 320 | 356545 | 370 | 368422 | 420 | 424873 | 470 |
| 334536 | 271 | 345546 | 321 | 357423 | 371 | 368433 | 421 | 425962 | 471 |
| 334547 | 272 | 346424 | 322 | 357434 | 372 | 368444 | 422 | 432226 | 472 |
| 335425 | 273 | 346435 | 323 | 357445 | 373 | 368522 | 423 | 432237 | 473 |
| 335436 | 274 | 346446 | 324 | 357523 | 374 | 368533 | 424 | 432248 | 474 |
| 335447 | 275 | 346524 | 325 | 357534 | 375 | 368544 | 425 | 432259 | 475 |
| 335525 | 276 | 346535 | 326 | 357545 | 376 | 368633 | 426 | 432337 | 476 |
| 335536 | 277 | 346546 | 327 | 357634 | 377 | 369522 | 427 | 432348 | 477 |
| 335547 | 278 | 346635 | 328 | 358523 | 378 | 369533 | 428 | 432772 | 478 |
| 335636 | 279 | 347524 | 329 | 358534 | 379 | 369622 | 429 | 432783 | 479 |
| 336525 | 280 | 347535 | 330 | 358623 | 380 | 369633 | 430 | 432794 | 480 |
| 336536 | 281 | 347624 | 331 | 358634 | 381 | 376332 | 431 | 433226 | 481 |
| 336625 | 282 | 347635 | 332 | 359623 | 382 | 376343 | 432 | 433237 | 482 |
| 336636 | 283 | 348624 | 333 | 359723 | 383 | 376354 | 433 | 433248 | 483 |
| 337625 | 284 | 348724 | 334 | 365222 | 384 | 376365 | 434 | 433326 | 484 |
| 337725 | 285 | 354223 | 335 | 365233 | 385 | 376443 | 435 | 433337 | 485 |
| 343224 | 286 | 354234 | 336 | 365244 | 386 | 376454 | 436 | 433348 | 486 |
| 343235 | 287 | 354245 | 337 | 365255 | 387 | 377332 | 437 | 433437 | 487 |
| 343246 | 288 | 354256 | 338 | 365266 | 388 | 377343 | 438 | 433772 | 488 |
| 343257 | 289 | 354267 | 339 | 365277 | 389 | 377354 | 439 | 433783 | 489 |
| 343268 | 290 | 354278 | 340 | 365333 | 390 | 377432 | 440 | 433872 | 490 |
| 343279 | 291 | 354334 | 341 | 365344 | 391 | 377443 | 441 | 433883 | 491 |
| 343335 | 292 | 354345 | 342 | 365355 | 392 | 377454 | 442 | 434326 | 492 |
| 343346 | 293 | 354356 | 343 | 365366 | 393 | 377543 | 443 | 434337 | 493 |
| 343357 | 294 | 354367 | 344 | 365444 | 394 | 378432 | 444 | 434426 | 494 |
| 343368 | 295 | 354445 | 345 | 365455 | 395 | 378443 | 445 | 434437 | 495 |
| 343446 | 296 | 354456 | 346 | 366222 | 396 | 378532 | 446 | 434872 | 496 |
| 343457 | 297 | 355223 | 347 | 366233 | 397 | 378543 | 447 | 434972 | 497 |
| 344224 | 298 | 355234 | 348 | 366244 | 398 | 379532 | 448 | 435426 | 498 |
| 344235 | 299 | 355245 | 349 | 366255 | 399 | 379632 | 449 | 435526 | 499 |

FIG. 16B

| Table I : The t-sequence table. Cluster6 ||||||||||
|---|---|---|---|---|---|---|---|---|---|
| t-seq | val | t-seq | val | t-seq | val | t-seq | val | t-seq | val |
| 442225 | 500 | 454257 | 550 | 466345 | 600 | 479522 | 650 | 543772 | 700 |
| 442236 | 501 | 454324 | 551 | 466423 | 601 | 479622 | 651 | 543872 | 701 |
| 442247 | 502 | 454335 | 552 | 466434 | 602 | 486332 | 652 | 544226 | 702 |
| 442268 | 503 | 454346 | 553 | 466445 | 603 | 486343 | 653 | 544326 | 703 |
| 442269 | 504 | 454357 | 554 | 466534 | 604 | 486354 | 654 | 544426 | 704 |
| 442336 | 505 | 454435 | 555 | 467323 | 605 | 486443 | 655 | 552225 | 705 |
| 442347 | 506 | 454446 | 556 | 467334 | 606 | 487332 | 656 | 552236 | 706 |
| 442358 | 507 | 455224 | 557 | 467423 | 607 | 487343 | 657 | 552247 | 707 |
| 442447 | 508 | 455235 | 558 | 467434 | 608 | 487432 | 658 | 552258 | 708 |
| 443225 | 509 | 455246 | 559 | 467523 | 609 | 487443 | 659 | 552336 | 709 |
| 443236 | 510 | 455324 | 560 | 467534 | 610 | 488432 | 660 | 552347 | 710 |
| 443247 | 511 | 455335 | 561 | 468423 | 611 | 488532 | 661 | 553225 | 711 |
| 443258 | 512 | 455346 | 562 | 468523 | 612 | 497442 | 662 | 553236 | 712 |
| 443325 | 513 | 455424 | 563 | 468623 | 613 | 522552 | 663 | 553247 | 713 |
| 443336 | 514 | 455435 | 564 | 475222 | 614 | 522563 | 664 | 553325 | 714 |
| 443347 | 515 | 455446 | 565 | 475233 | 615 | 522574 | 665 | 553336 | 715 |
| 443358 | 516 | 455535 | 566 | 475244 | 616 | 522585 | 666 | 553347 | 716 |
| 443436 | 517 | 456324 | 567 | 475255 | 617 | 522663 | 667 | 553436 | 717 |
| 443447 | 518 | 456335 | 568 | 475266 | 618 | 522674 | 668 | 554225 | 718 |
| 444225 | 519 | 456424 | 569 | 475333 | 619 | 523652 | 669 | 554236 | 719 |
| 444236 | 520 | 456435 | 570 | 475344 | 620 | 523663 | 670 | 554325 | 720 |
| 444247 | 521 | 456524 | 571 | 475355 | 621 | 523674 | 671 | 554336 | 721 |
| 444325 | 522 | 456535 | 572 | 475444 | 622 | 523763 | 672 | 554425 | 722 |
| 444336 | 523 | 457424 | 573 | 476222 | 623 | 524752 | 673 | 554436 | 723 |
| 444347 | 524 | 457524 | 574 | 476233 | 624 | 524763 | 674 | 555225 | 724 |
| 444425 | 525 | 457624 | 575 | 476244 | 625 | 525852 | 675 | 555325 | 725 |
| 444436 | 526 | 464223 | 576 | 476255 | 626 | 532227 | 676 | 555425 | 726 |
| 444447 | 527 | 464234 | 577 | 476322 | 627 | 532238 | 677 | 555525 | 727 |
| 444536 | 528 | 464245 | 578 | 476333 | 628 | 532662 | 678 | 563224 | 728 |
| 445325 | 529 | 464256 | 579 | 476344 | 629 | 532673 | 679 | 563235 | 729 |
| 445336 | 530 | 464267 | 580 | 476355 | 630 | 532684 | 680 | 563246 | 730 |
| 445425 | 531 | 464334 | 581 | 476433 | 631 | 532773 | 681 | 563257 | 731 |
| 445436 | 532 | 464345 | 582 | 476444 | 632 | 533227 | 682 | 563335 | 732 |
| 445525 | 533 | 464356 | 583 | 477222 | 633 | 533327 | 683 | 563346 | 733 |
| 445536 | 534 | 464445 | 584 | 477233 | 634 | 533662 | 684 | 564224 | 734 |
| 446425 | 535 | 465223 | 585 | 477244 | 635 | 533673 | 685 | 564235 | 735 |
| 446525 | 536 | 465234 | 586 | 477322 | 636 | 533762 | 686 | 564246 | 736 |
| 446625 | 537 | 465245 | 587 | 477333 | 637 | 533773 | 687 | 564324 | 737 |
| 453224 | 538 | 465256 | 588 | 477344 | 638 | 534762 | 688 | 564335 | 738 |
| 453235 | 539 | 465323 | 589 | 477422 | 639 | 534862 | 689 | 564346 | 739 |
| 453246 | 540 | 465334 | 590 | 477433 | 640 | 542226 | 690 | 564435 | 740 |
| 453257 | 541 | 465345 | 591 | 477444 | 641 | 542237 | 691 | 565224 | 741 |
| 453268 | 542 | 465356 | 592 | 477533 | 642 | 542248 | 692 | 565235 | 742 |
| 453335 | 543 | 465434 | 593 | 478322 | 643 | 542337 | 693 | 565324 | 743 |
| 453346 | 544 | 465445 | 594 | 478333 | 644 | 542772 | 694 | 565335 | 744 |
| 453357 | 545 | 466223 | 595 | 478422 | 645 | 542783 | 695 | 565424 | 745 |
| 453446 | 546 | 466234 | 596 | 478433 | 646 | 543226 | 696 | 565435 | 746 |
| 454224 | 547 | 466245 | 597 | 478522 | 647 | 543237 | 697 | 566224 | 747 |
| 454235 | 548 | 466323 | 598 | 478533 | 648 | 543326 | 698 | 566324 | 748 |
| 454246 | 549 | 466334 | 599 | 479422 | 649 | 543337 | 699 | 566424 | 749 |

FIG. 16C

| Table I : The t-sequence table. Cluster6 ||||||||||
|---|---|---|---|---|---|---|---|---|---|
| t-seq | val | t-seq | val | t-seq | val | t-seq | val | t-seq | val |
| 566524 | 750 | 622442 | 800 | 674324 | 850 | 742552 | 900 | | |
| 574223 | 751 | 622453 | 801 | 674335 | 851 | 742563 | 901 | | |
| 574234 | 752 | 622464 | 802 | 675224 | 852 | 743552 | 902 | | |
| 574245 | 753 | 622475 | 803 | 675324 | 853 | 743652 | 903 | | |
| 574256 | 754 | 622553 | 804 | 675424 | 854 | 752662 | 904 | | |
| 574334 | 755 | 622564 | 805 | 684223 | 855 | 762226 | 905 | | |
| 574345 | 756 | 623542 | 806 | 684234 | 856 | 772225 | 906 | | |
| 575223 | 757 | 623553 | 807 | 684245 | 857 | 772236 | 907 | | |
| 575234 | 758 | 623564 | 808 | 684334 | 858 | 773225 | 908 | | |
| 575245 | 759 | 623653 | 809 | 685223 | 859 | 773325 | 909 | | |
| 575323 | 760 | 624642 | 810 | 685234 | 860 | 783224 | 910 | | |
| 575334 | 761 | 624653 | 811 | 685323 | 861 | 783235 | 911 | | |
| 575345 | 762 | 625742 | 812 | 685334 | 862 | 784224 | 912 | | |
| 575434 | 763 | 632552 | 813 | 686223 | 863 | 784324 | 913 | | |
| 576223 | 764 | 632563 | 814 | 686323 | 864 | 794223 | 914 | | |
| 576234 | 765 | 632574 | 815 | 686423 | 865 | 794234 | 915 | | |
| 576323 | 766 | 632663 | 816 | 695222 | 866 | 795223 | 916 | | |
| 576334 | 767 | 633552 | 817 | 695233 | 867 | 795323 | 917 | | |
| 576423 | 768 | 633563 | 818 | 695244 | 868 | 832332 | 918 | | |
| 576434 | 769 | 633652 | 819 | 695333 | 869 | 832343 | 919 | | |
| 577223 | 770 | 633663 | 820 | 696222 | 870 | 832354 | 920 | | |
| 577323 | 771 | 634652 | 821 | 696233 | 871 | 832443 | 921 | | |
| 577423 | 772 | 634752 | 822 | 696322 | 872 | 833432 | 922 | | |
| 577523 | 773 | 642227 | 823 | 696333 | 873 | 833443 | 923 | | |
| 585222 | 774 | 642662 | 824 | 697222 | 874 | 834532 | 924 | | |
| 585233 | 775 | 642673 | 825 | 697322 | 875 | 842442 | 925 | | |
| 585244 | 776 | 643662 | 826 | 697422 | 876 | 842453 | 926 | | |
| 585255 | 777 | 643762 | 827 | 722332 | 877 | 843442 | 927 | | |
| 585333 | 778 | 652226 | 828 | 722343 | 878 | 843542 | 928 | | |
| 585344 | 779 | 652237 | 829 | 722354 | 879 | | | | |
| 586222 | 780 | 652772 | 830 | 722365 | 880 | | | | |
| 586233 | 781 | 653226 | 831 | 722443 | 881 | | | | |
| 586244 | 782 | 653326 | 832 | 722454 | 882 | | | | |
| 586322 | 783 | 662225 | 833 | 723432 | 883 | | | | |
| 586333 | 784 | 662236 | 834 | 723443 | 884 | | | | |
| 586344 | 785 | 662247 | 835 | 723454 | 885 | | | | |
| 586433 | 786 | 662336 | 836 | 723543 | 886 | | | | |
| 587222 | 787 | 663225 | 837 | 724532 | 887 | | | | |
| 587233 | 788 | 663236 | 838 | 724543 | 888 | | | | |
| 587322 | 789 | 663325 | 839 | 725632 | 889 | | | | |
| 587333 | 790 | 663336 | 840 | 732442 | 890 | | | | |
| 587422 | 791 | 664225 | 841 | 732453 | 891 | | | | |
| 587433 | 792 | 664325 | 842 | 732464 | 892 | | | | |
| 588322 | 793 | 664425 | 843 | 732553 | 893 | | | | |
| 588422 | 794 | 673224 | 844 | 733442 | 894 | | | | |
| 588522 | 795 | 673235 | 845 | 733453 | 895 | | | | |
| 596332 | 796 | 673246 | 846 | 733542 | 896 | | | | |
| 596343 | 797 | 673335 | 847 | 733553 | 897 | | | | |
| 597332 | 798 | 674224 | 848 | 734542 | 898 | | | | |
| 597432 | 799 | 674235 | 849 | 734642 | 899 | | | | |

../src/pdf174.c

```
#include <stdio.h>
#define MODULE 9

FILE *fopen(),*fout[9];

int t[8];
int x[8] = {0,0,0,0,0,0,0,0};
int b[13] = {0,0,0,0,0,0,0,0,0,0,0,0,0};
int m = 7;
int n = 9; /*17 - 8*/
int other = 0;
int total = 0;

int grteq(i)
int i;
{
int k,flag;

flag=0;
    for(k=0;k<=m;k++) if(x[k] >= i) flag=1;
    return(flag);
}
```

FIG. 17B

```
void s(i)
int i;
{
int k,sum,j,tmp;

sum=0;
    for(k=0;k<i;k++) sum += x[k];
    if(i == m){
      x[m] = n - sum;
      for(k=0;k<m;k++) t[k] = x[k]+x[k+1];
      tmp = x[0] - x[2] + x[4] - x[6];
      tmp = tmp%MODULE;
      if(tmp < 0) tmp += MODULE;
      total++;
      if(grteq(6)) other++;
        else{ b[tmp]++;
              for(k=0;k<m;k++)
                 fprintf(fout[tmp],"%d ",t[k]+2);
              fprintf(fout[tmp],"\n");
            }
    }else{
       for(j=0;j<=(n-sum);j++){x[i]=j; s(i+1);}
    }
}
```

FIG. 17C

```
main()
{
int k;

fout[0]=fopen("out0","w");
    fout[1]=fopen("out1","w");
    fout[2]=fopen("out2","w");
    fout[3]=fopen("out3","w");
    fout[4]=fopen("out4","w");
    fout[5]=fopen("out5","w");
    fout[6]=fopen("out6","w");
    fout[7]=fopen("out7","w");
    fout[8]=fopen("out8","w");
    s(0);
    for(k=0;k<MODULE;k++) fclose(fout[k]);
}
```

MICROFILM READER FOR HIGH DENSITY, TWO DIMENSIONAL BAR CODE SYMBOLOGY

This is a division of application Ser. No. 8/329,635, filed Oct. 26, 1994 now U.S. Pat. No. 5,504,322 which is a divisional of U.S. Ser. No. 08/126,965, filed Sep.27,1993, now U.S. Pat. No. 5,399,846 which is a divisional of U.S. Ser. No. 07/461,881, filed Jan. 5, 1990 now U.S. Pat. No. 5,304,786.

1 BACKGROUND OF THE INVENTION

The present invention relates to a nonvolatile electro-optical read-only memory, comprising a substrate on which is printed (or otherwise inscribed) a complex symbol or "label" with a high density two-dimensional symbology, a variable number of component symbols or "code-words" per line, and a variable number of lines.

1.1 Bar Code Symbology

A bar code is typically a linear array of elements that are either printed directly on an object or on labels that are affixed to the object. As shown in FIGS. 1 and 2, bar code elements typically comprise bars and spaces, with bars of varying widths representing strings of binary ones and spaces of varying widths representing strings of binary zeros. Many bar codes are optically detectable and are read by devices such as scanning laser beams or handheld wands. Other bar codes are implemented in magnetic media. The readers and scanning systems electro-optically decode the symbol to multiple alphanumerical characters that are intended to be descriptive of the article or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470 and 4,460,120, all of which have been assigned to the same assignee as the instant application.

Most bar codes presently used containly only five or six letters or digits, no more than a typical vehicle license plate. In view of the relatively small amount of data contained in a typical linear bar code, the most typical applications of a bar code are to use the encoded data merely as an index to a file or data base associated with the computer system where comprehensive information is available.

As noted above, the contrasting parallel bars and spaces (referred to herein as "marks") of typical optically-detectable bar codes have varying widths. Generally, the bars and spaces can be no smaller than a specified minimum width, termed the code's "unit" (or "x dimension" or "module"). While the theoretical minimum unit size is the wavelength of the light being used to read the bar code, other practical limitations exist. Among these limitations are the desired depth of field of the reading equipment, the limitations of a given printing process, and the robustness of the printed image to be correctly read despite dust, dirt, and minor physical damage.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPS/EAN, Code 39, Code 93, Code 128, Codabar, and Interleaved 2 of 5.

1.2 Symbologies of (n,k) Type

Some bar codes are referred to as belonging to the (n,k) family defined by Savir and Laurer in "The Characteristics and Decodeability of the Universal Product Code," IBM Systems Journal, Vol. 14, No. 1, 1975. A code of (n,k) type represents characters uniquely by a string of n bits each containing k runs of one bit (i.e., k bars) and k runs of zero bits (i.e., k spaces). An (n,k) code is decodable in both directions, i.e., by scanning it either forward or backwards. Such bar codes are often referred to by the numbers n and k; for example, the well-known Code 93 derives its name from this (n,k) notation, i.e., n=9 and k=3. The UPC code is an example of a (7,2) code, i.e., n=7 and k=2.

1.3 Prior Two-Dimensional Bar Codes

Know two-dimensional bar codes exist that are extensions of one-dimensional bar codes, in that one-dimensional bar codes are stacked with horizontal guard bars between them to increase the density. An example of such bar codes is seen in U.S. Pat. No. 4,794,239, to Allais.

An obstacle to increasing the density of two-dimensional bar codes is the need for a certain minimum height in the vertical direction. A minimum height is needed to ensure that a human operator can keep a "scan line" (i.e., the path of a given scanning motion, such as that achieved by passing a hand-held wand across a bar code) within the area of a single bar-code row. FIG. 1 illustrates this difficulty: scan lines 10, 11, and 12 represent identical exemplar paths of, e.g., hand-held wands over the bar codes 15, 16, and 17. It will be seen that with a tall bar code 15, the scan lines 10 all stay within the confines of one bar code row, whereas with shorter bar codes 16 or 17, the scan lines 11 and 12 cross from one row to another.

Another limitation seen in some known two-dimensional bar codes is the use of fixed maps to translate from codewords to characters. The fixed maps restrict the flexibility of applications. For example, the well-known Code 49 has six fixed maps (i.e., six modes) to translate a codeword numerically or alphanumerically.

Although such two-dimensional bar codes provide some increase in the storage capacity, such codes are still used as indices for file look-up, rather than as a complete data file in itself.

Still another drawback of some known two-dimensional codes is the need for a fixed number of codewords per line (referred to here as a "row") and the limitation of a maximum number of rows. For instance, Code 49 (a bar code generally in accordance with the aforementioned Allais '239 patent) has 4 codewords per row and 8 row maximum.

Yet another problem is the lack of flexibility in choosing a suitable security system. (The term "security" is commonly used to refer to confidence in accuracy or correctness; it is usually specified by a misdecode rate, e.g., in errors per million). Code 49, for example, provides a very high level of security while sacrificing about 30% of its codewords on average for checking errors. In some applications, however, a lesser degree of security may be an acceptable trade-off in return for a greater codeword density; the ability to vary the security would be advantageous.

2 SUMMARY OF THE INVENTION

The present invention provides an improved high-density two-dimensional symbology, as well as a flexible method for using the symbology to encode and decode data. The symbology may be used to create a nonvolatile read-only memory, which in turn may be used in a computer system.

Prior codes have been restricted in terms of information capacity or density. The present invention achieves storage capacity of up to 1 kilobytes of memory within an area of one to four square inches. The significance of such a memory should not be underestimated—it represents about 250 English words, about the size of a page or screen display. As an information unit, such unit is most suitable for may applications.

2.1 Summary of Label Row-Wise Organization

A two-dimensional label in accordance with the invention comprises multiple rows of codewords; that is, the term "label" is used here to mean a complex marking of specified dimensions that includes a number of codewords organized in rows. Each codeword is a mark pattern comprising a plurality of elements or marks; the marks can be of various heights, as in a bar code, or can be of a relatively small height to form a "dot code." Not just any mark pattern can constitute a codeword, however; each codeword belongs to a specific family or "set" of mark patterns that conforms to a particular descriptive rule about some characteristic of each mark pattern, e.g., a rule about the width of each mark and the total width of each mark pattern.

The codewords in any two adjacent rows are written in mutually exclusive subsets of the mark pattern set (although in some embodiments the union of the subsets is not exhaustive of the set itself). In particular, each subset of the mark-pattern set is defined so that it includes, as valid codewords for that subset, only those mark patterns that satisfy certain discriminator-function criteria.

Such rowwise usage of alternating subsets of codewords, grouped according to discriminator-function criteria, permits quick determination whether a row has been crossed, without the need for a horizontal guard bar. That is, for a given scanned codeword in a label, determination of the discriminator function indicates whether the codeword comes from the same row as the previously-scanned codeword or from a different row (that is, whether the scan line has crossed between rows as illustrated in FIG. 1).

Detection of line-crossing permits "stitching" of partial scans of particular rows into a map (e.g., in memory) of the label. The stitching process is roughly analogous to stitching a number of pieces of colored fabric into a pre-designed quilt that displays, e.g., a picture: as each "piece" is acquired by the scanning process, it is incorporated piecewise into the appropriate point in the label.

For example, suppose that computation of the appropriate discriminator functions reveals that a scanning pass has scanned the first half of row 1 and the second half of row 2 of a label such as is shown in FIG. 3. Assume that the respective longitudes of the scanned data with respect to the ends of the label are known, e.g., through detection of start- and/or stop-codes. The knowledge that a row boundary has been crossed permits all the scanned data from the scanning pass to be incorporated into the respective proper rows of the label map at the respective proper longitudes (assuming no scanning or decoding errors); the data from the scanning pass need not be discarded merely because the data did not all come from a single desired row.

As another (greatly simplified) hypothetical example, assume that a part of one row has been scanned and that the data "123456789" are incorporated into the label map as a result. Further assume that a second scanning pass of that row is made, and that the data "6789ABCD" are decoded as a result. If the overlapping portion if any between the two scanned data "pieces"—in this case, the "6789" portion— can be determined (e.g., with string-matching techniques such as described below), then the remainder of the later-scanned data can be appropriately incorporated into the label map (in this case, the "ABCD" portion).

Consequently, the operator need not be scrupulously careful to sweep the wand over the label one row at a time; virtually any scanning pass that includes either a row's start code or a stop code, or that can somehow be determined to overlap with data already incorporated in the label map, will yield useable data (assuming no coding or decoding errors). A label in accordance with the invention thus advantageously increases the density of information by permitting height reductions in the codewords.

2.2 Summary of Organization of Codeword Subsets

As note above, a key feature of the invention is the use of different codeword subsets in different rows, each subset satisfying certain discriminator-function criteria. In one embodiment described here for illustrative purposes, a (17, 4) symbology is used. A discriminator function is used to divide the 11,400 available mark patterns in that symbology into three mark-pattern subsets of 929 codewords each.

The discriminator function may take as its inputs the various widths of the on- and off marks of a mark pattern (e.g., optically detectable bars and spaces) and may provide as an output a number from 0 to 8. Three subsets may then be selected whose discriminator function values are 0, 3, and 6, respectively, and whose mark widths meet certain other criteria. Each subset thus comprises a collection of codewords, all of whose discriminator functions are both equal to each other and readily distinguishable from those of the codewords in the other two subsets.

The availability of 929 codewords in each subset, each with a unique discriminatory-function number, permits each codeword to be used to represent a two-digit number in base 30. This capability leads to several advantages.

As shown in FIG. 5, each digit of the two-digit base-30 number can be used in an "alpha mode" or in a "mixed mode": that is, each digit can be mapped into a 30-place alphabetic translation table or into a 30-place mixed alphanumeric translation table. In each of these 30-place tables, one or more digits are reserved for use as signals to change translation tables.

Alternatively, each two-digit number can be used in a "numeric mode" or in a "user mode": that is, each number can be mapped into a 929-place numeric translation table or into any of up to twenty-seven 929-place user-defined translation tables. In each of these tables as well, one or more digits are reserved for use as signals to begin using a different translation table.

2.3 Summary of Two-Step Decoding Method

The decoding method of the invention advantageously makes use of the symbology organization of the invention. In the first step, when a codeword is scanned, the discriminator function of the scanned codeword is computed to determine the codeword subset of which the scanned codeword is a member. A t-sequence number based on the width of the marks comprising the codeword is also computed; that number is used as an entry point into a lookup table for the codeword subset in question. The lookup table yields a number from 0 to 928, which is parsed into a two-digit number in base 30.

In the second step, the high- and low-order digits of the base-30 number are used to determine the symbolic meaning assigned to the codeword (which may include an instruction to change translation tables).

The method of the invention thus advantageously permits the user to define multiple translation tables. In addition, the invention is not constrained by logical limits on the number of codewords per row nor on the number of rows. This gives the user freedom to lay out the symbology in areas of varying shapes.

2.4 Summary of Error Detection and Correction

A row-oriented incremental error detection capability is provided through the use of a checksum codeword for each row. After completion of low-level decoding but before performance of high-level decoding, various checksum computations are performed to test the accuracy of the scan.

In addition, a "final" checksum codeword for the label as a whole is used for additional security. The use of these checksums permits a limited degree of error recovery, since the checksums reflect the information contents of each of the codewords in the label. That is, errors in decoding particular codewords can be corrected in some circumstances by "subtracting" the known correct codewords from the checksum, so to speak, thereby yielding the correct value for the erroneously decoded codeword.

If the test results are satisfactory, the high-level decoding step is performed.

2.5 Summary of System Implementation

Another feature of the present invention is to provide a system for reading bar code symbols or the like, including a hand-held scanning unit in a lightweight, portable housing including a symbol-detection device for generating a laser beam directed toward a symbol to be read, and for receiving reflected light from such symbol to produce electrical signals corresponding to data represented by the symbol: a data processing device for processing the data represented by the symbol having a state according to at least first and second different coding procedures; and a read-control device to actuate the symbol-detection device to initiate reading of a symbol; wherein the symbol includes at least two groups of codewords; each codeword representing at least one information-bearing character and being selected from among a set of valid mark patterns. Each mark pattern comprises a pattern of marks, each mark pattern being representative of encoded data according to one of a plurality of different coding procedures: the codewords in each group being selected from a subset for said group being defined by a specified rule for that group that differs from the rule specified for said different group; each coding procedure being a function of the state of the data processing device.

3 BRIEF DESCRIPTION OF THE DRAWINGS

FIG. 5 is a table showing alternate translation modes for encoding or decoding codewords.

FIG. 7 is a pictorial representation of a sequence of encoding a string of readable characters into scannable codewords.

Figure 8:
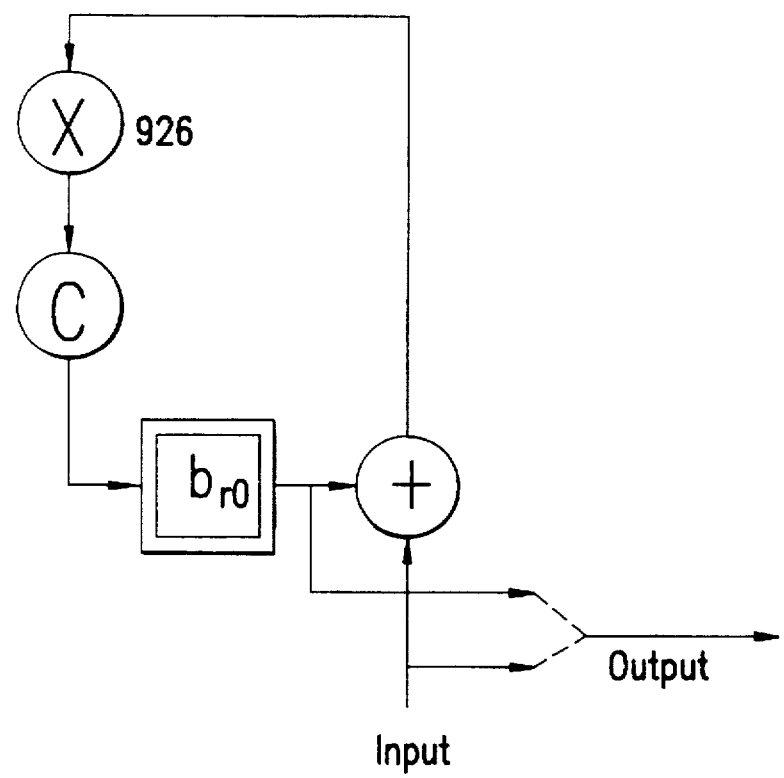
Figure 9:
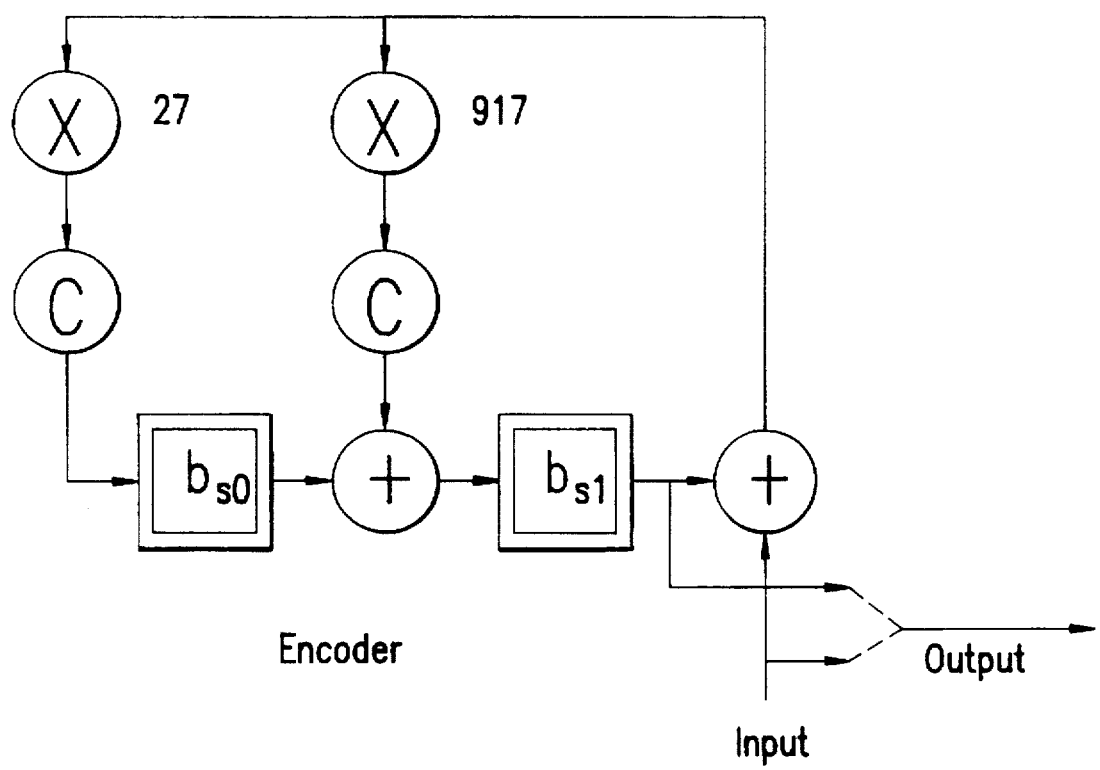
Figures 10, 11:
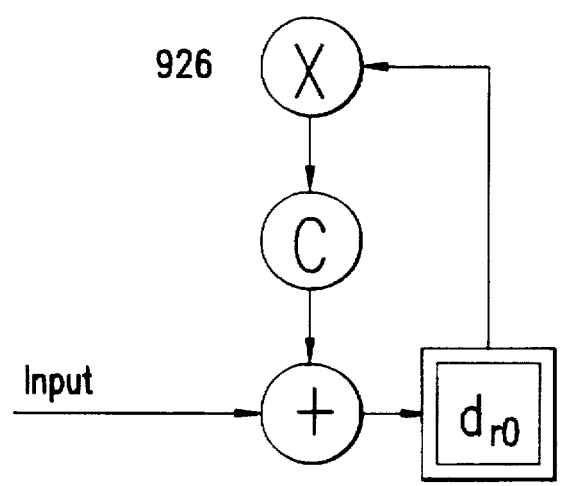

FIG. 8 is a logic diagram of an illustrative circuit for computing a checksum for a row in a label embodying the invention; FIG. 9 shows a similar circuit for computing an additional checksum for the entire label. FIG. 10 is a schematic illustration of the layout of codewords within a label.

Figure 12:
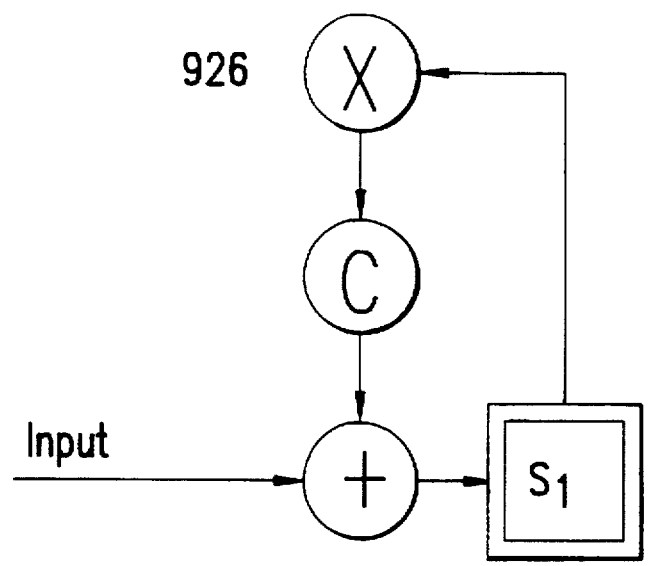
Figure 13:
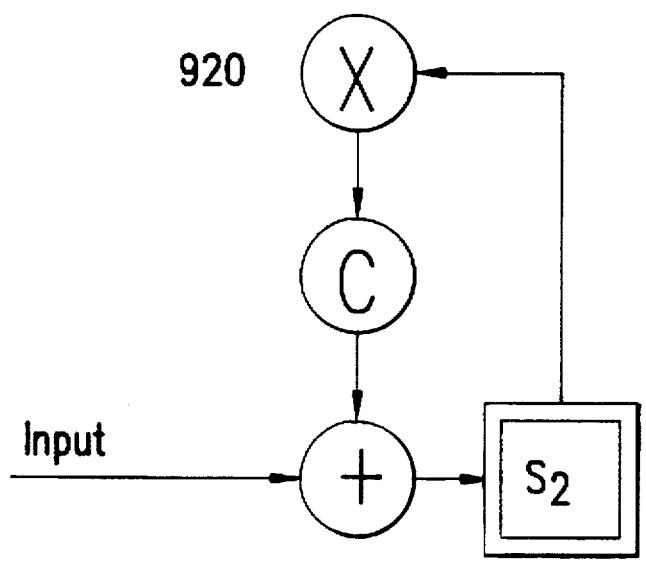

FIGS. 11 through 13 are logic diagrams of illustrative circuits for performing error recovery in accordance with the invention.

FIGS. 14A through 14D, FIGS. 15A through 15D, and FIGS. 16A through 16D depict tables used for decoding codewords in three different sub-symbologies. FIGS. 17A–17C are a C-language program that may be used to generate these tables.

Figure 18:
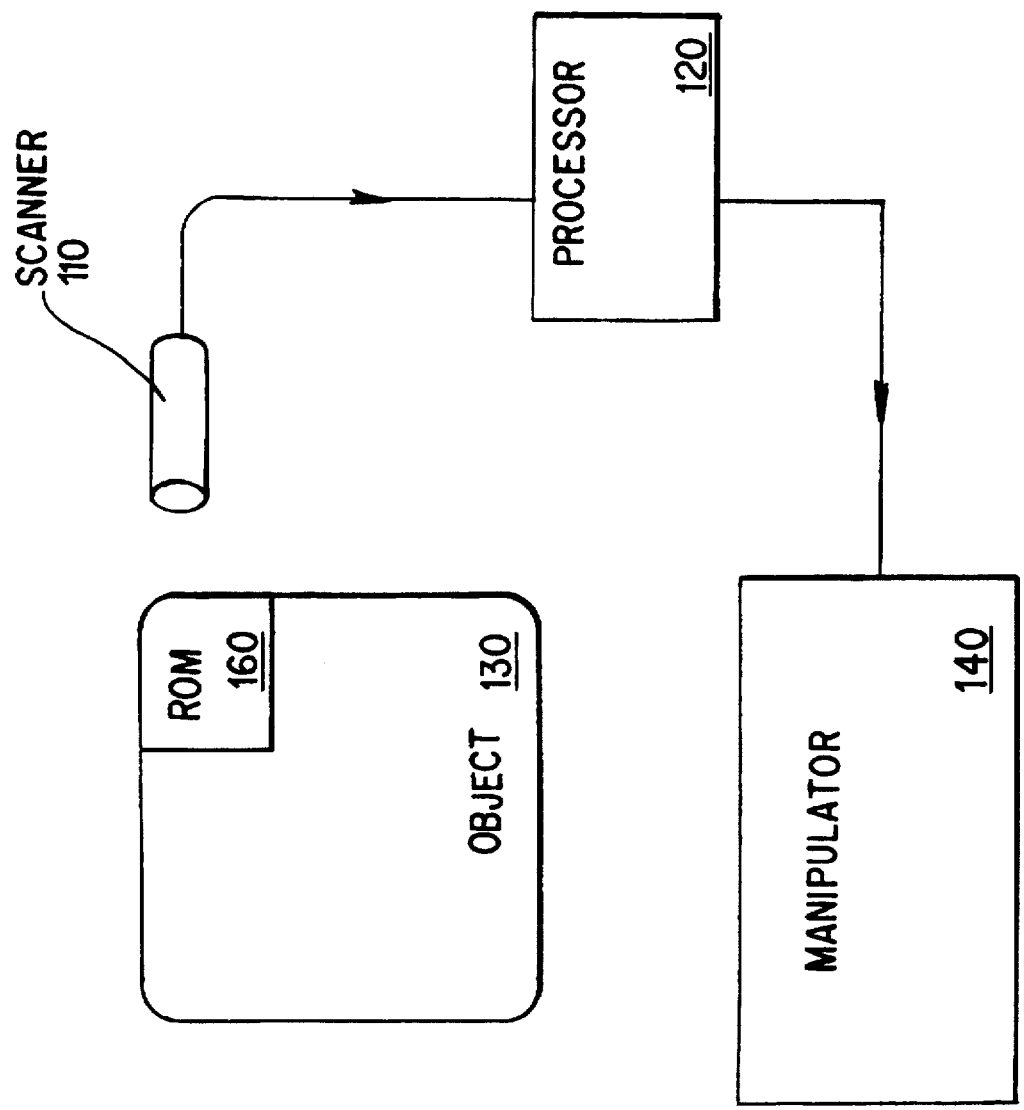
Figure 19B:
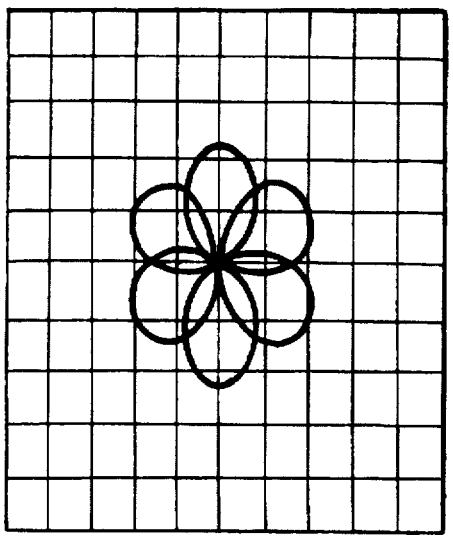
Figure 19A:
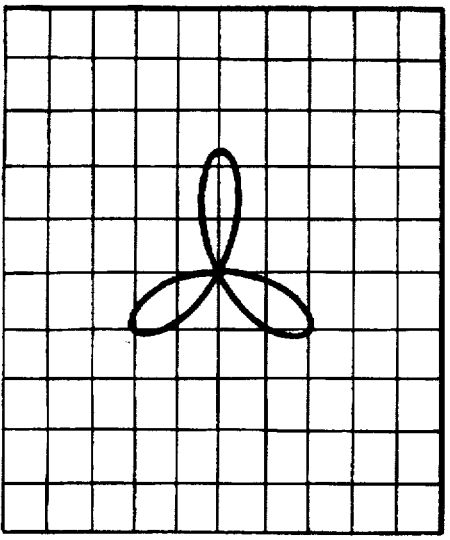
Figure 19D:
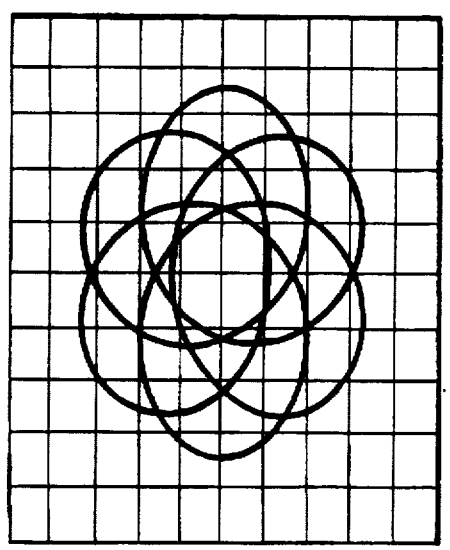
Figure 19C:
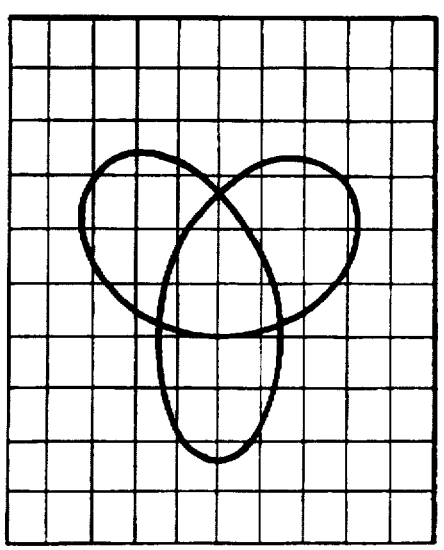

FIG. 18 is a block diagram of a computer system using a nonvolatile electro-optical memory in accordance with the invention.

Figure 20:
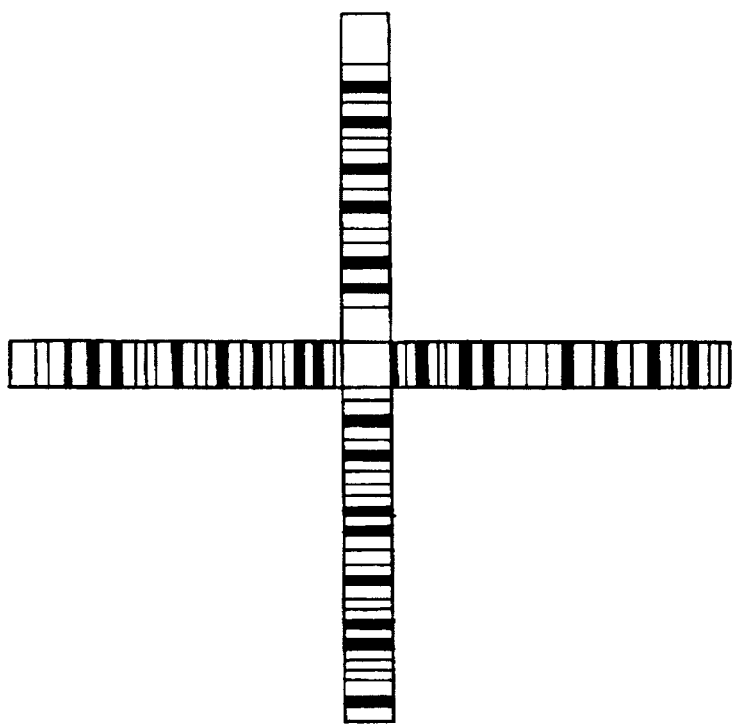
Figure 21:
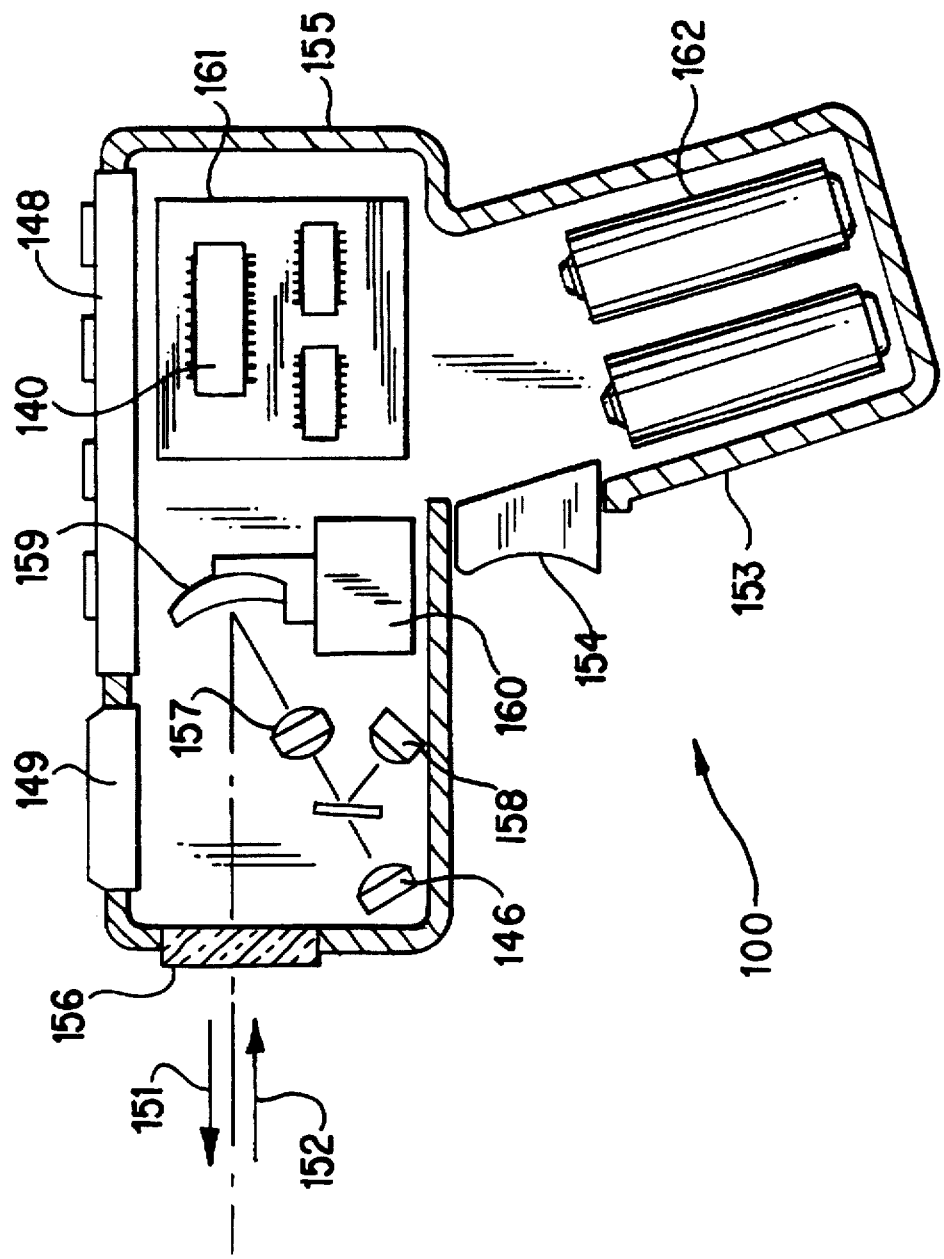

FIGS. 19a, 19b, 19c, and 19d depict alternative type of laser scanning pattern that may be used in connection with the present invention;

FIG. 20 shows an alternative arrangement of a bar code symbol;

FIG. 21 shows a cross-sectional view of an implementation of a hand-held laser scanner which may be used to implement the present invention.

Figure 22:
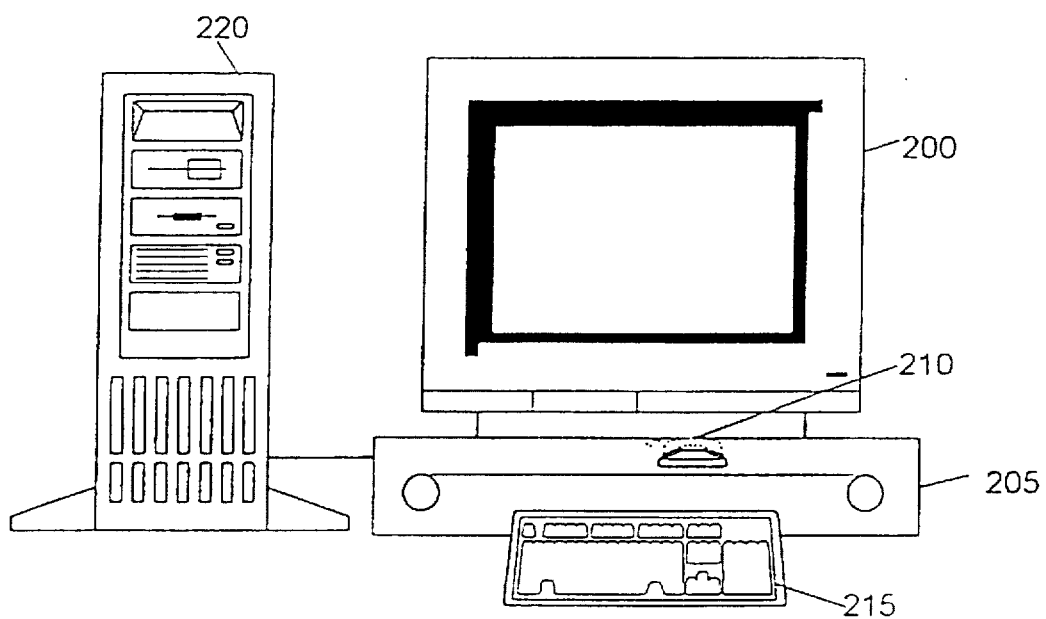

FIG. 22 illustrates a microfilm reader in accordance with the invention.

4 DETAILED DESCRIPTION OF SPECIFIC EMBODIMENTS 4.1 Stitching of Partial Scans

Figure 1A:
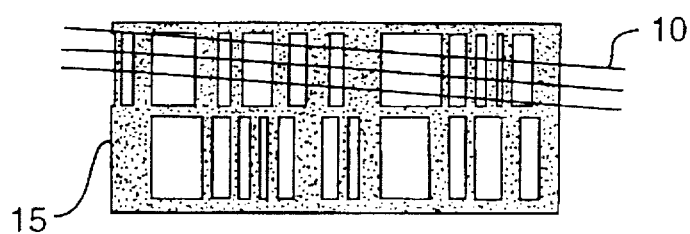
FIG. 1A is an illustration of prior art bar code symbologies.
Figure 1B:
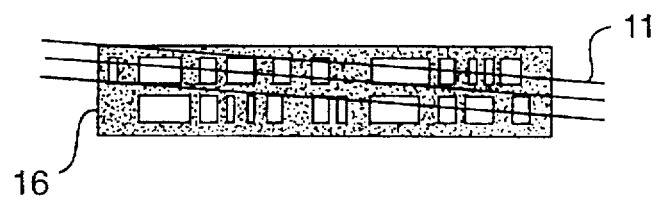
FIG. 1C is an illustration of a label in accordance with the present invention.
Figure 1C:
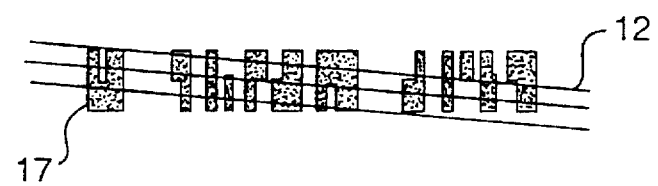

The label of the invention proves especially useful for stitching together of partial scans. As noted above (and referring to FIG. 1), when scan lines 12 cross codeword rows in a label 17, the partial scans must be "stitched" or pieced together. For example, consider a retail store checkout counter where a sales clerk manually passes a hand-held wand over a multirow label. If the wand's travel does not run substantially parallel to the label, the scan line may pass from one row to another; parts of different rows are thus scanned, but neither row is scanned completely.

Stitching entails building a map of each row of the label (e.g. in memory); successive passes of the wand result in a greater degree of filling in the map. It can be accomplished by using known string matching algorithms, such as disclosed in D. Sankoff and J. B. Kruskal, editors, Time Warps, String Edits, and Macro-molecules: The Theory and Practice of Sequence Comparison, Addison-Wesley, Reading, Mass., 1983. One such algorithm is described below.

4.2 Partitioned Symbology

Stitching is facilitated by using different sub-symbologies in alternate rows, selected so that the scanner can make a local decision on whether a row has been crossed. Using different sub-symbologies in alternate rows allows the elimination of horizontal guard bars seen in prior-art code symbologies, thus permitting higher density of information.

The illustrative embodiment of the present invention utilizes an advantageous scheme for organizing codewords into readily distinguishable groups. The scheme makes use of the principle of coding theorem to pick only a fraction of available mark patterns as legal code words to increase decoding reliability; it can be applied to any of a number of labels.

One such label, referred to here as a "PDF417" label (for "Portable Data File 417"), is described as an illustration of this invention. PDF417 is a (17,4) label of the (n,k) type described above. Each codeword has 4 bars and 4 spaces with a total width of 17 modules.

It can be shown that this code yields a set of 11,440 different combinations of mark patterns. To increase decoding reliability, only a fraction of these available mark patterns are used as valid codewords.

4.3 Discriminator Function for Defining Subset Partition

As a first step in selecting a group of mark patterns for such use for this particular code, the 11,440 mark patterns are partitioned into non subsets or "clusters," by calculating a discriminator function f(X) for each mark pattern X:

$$f(X)=(x_1-x_3+x_5-x_7) \bmod 9$$

wherein $x_1$, $x_3$, $x_5$ and $x_7$ stand for the bars' widths, and $x_2$, $x_4$, $x_6$ and $x_8$ stand for the spaces' widths. The discriminator function f(X) above is one of possible alternative equations used to subdivide the different possible combinations into nine different subsets.

Further narrowing is performed on three of the nine subsets of mark patterns, namely the subsets in which f(X)=0, f(X)=3, and f(X)=6 (sometimes called cluster(0) cluster(3) and cluster(6), respectively). The narrowing is performed in part by defining a "t-sequence" for each mark pattern. Each element $t_k$ of the t-sequence is computed according to the formula:

$$t_k=x_k+x_{k+1}, \text{ where } k=1, \ldots, 7$$

The three subsets cluster(i) (where i=0, 3, 6) are narrowed by selecting mark patterns where no mark width $x_j$ is more than six (where j=1, . . . 7), and where no $t_k$ is more than nine (where k=1, . . . , 8).

Thus, the three final subsets cluster(i) of the mark patterns X that are selected for use as code words can be summarized as follows:

$$cluster(i)=\{X:f(X)=i, x_j \leq 6, t_k \leq 9\}$$

where i=0, 3, 6, j=1, . . . , 8, and k=1, . . . , 7. After sorting each cluster by the t-sequence while suppressing duplicate entries, it can be shown that each cluster(i) includes at least 934 mark patterns. The closest prime number to 934 is 929; accordingly, 929 mark patterns are selected from each cluster(i) for use as codewords. (For convenience, the term "x-sequence," with respect to any given mark pattern, is defined as the number having as its digits $x_1, x_2, \ldots, x_g$).

Figure 2:
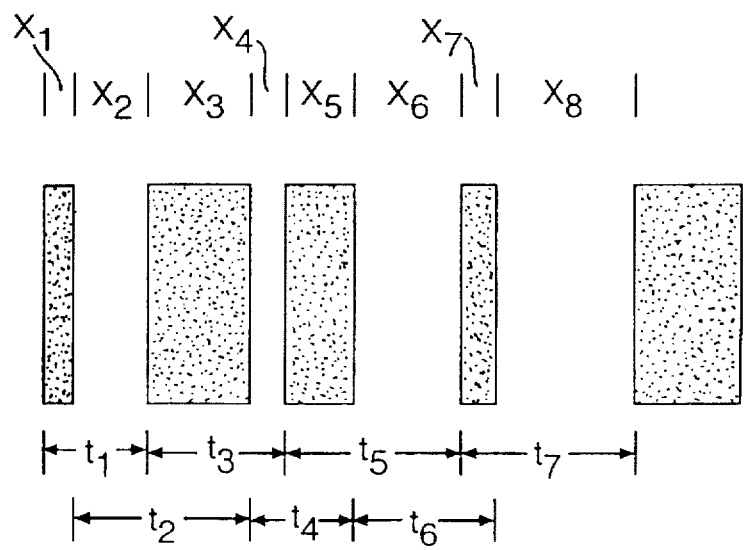
FIG. 2 is an illustration of the relationship between an x-sequence and a t-sequence in a codeword comprising part of a label embodying the present invention.

The t-sequence of each codeword can be used to identify that codeword, since it can be shown that each such t-sequence is unique within the three subsets cluster(i). It will be apparent that only the first six digits of the seven-digit t-sequence need be used to uniquely specify a codeword of the (17,4) type, since as illustrated in FIG. 2, the value of the final t-sequence element $t_7$ is completely determined by the first six elements $t_1$ and the fixed total width $\Sigma x_1$ of the mark pattern. As an example, suppose that $t_1=2$, $t_2=4$, $t_3=6$, $t_4=7$, $t_5=6$, and $t_6=4$; the t-sequence for that codeword would be 246764.

The partition just described has the advantage that, by computing f(X) for any scanned mark pattern, the mark pattern's membership (or nonmembership) in a codeword subset can quickly be ascertained. Furthermore, since the t-sequence for each codeword is unique, computation of the t-sequence permits that value to be used in a lookup table to determine the symbolic meaning assigned to a scanned mark pattern that belongs to a codeword subset.

Other equivalent discriminator functions f(X) may be constructed and used. Preferably, such a discriminator function should partition the available mark patterns into clusters (not necessarily nine clusters) approximately uniform in size. In addition, the clusters selected for use as codewords preferably are equidistant in "error distance"; that is, the probability that a codeword from any of selected clusters A, B, C, etc., will be mistaken for a codeword from another one of those clusters should be of the same order of magnitude regardless of which of the other clusters is considered.

4.4 Generating Subsets of Codewords

An example of a computer program for generating lists of codewords for the various clusters(i) is set forth in FIG. 17. The example program is written for convenience in the well-known C programming language, although any suitable language may be used; the example program is used generally as follows:

1. The program of FIG. 17 is used to generate 9 output files, referred to here as out(i), where i=0, . . . . 8. Only the output files out(0), out(3), and out(6) are used; they may be renamed as "cluster" files cluster(0), cluster(3), and cluster (6), respectively.

2. All three cluster files are conventionally sorted to remove ambiguous entries, i.e., to eliminate any mark pattern whose t-sequence is identical to the t-sequence of any other mark pattern.

3. The cluster files cluster(3) and cluster(6) are conventionally filtered to remove those entries in which any $t_k$ is wider than 9.

4. In the cluster file cluster(0), those odd entries (i.e., the first entry, third entry, etc.) in which any $t_k$ is wider than 6 are filtered out, as are those even entries in which any $t_k$ is wider than 7. This is an arbitrary restriction designed to help make cluster(0) approximately the same size as cluster(3) and cluster(6), inasmuch as without such a restriction cluster (0) would be larger than the other two.

5. The first 929 t-sequences of each of the filtered cluster files are selected as the desired entries for the respective lookup tables.

4.5 Multirow Label Using Alternating Codeword Subsets

In the multirow label of the invention, each row uses codewords from a different subset than the rows immediately adjacent to it. This enables the scanner to recognize with a high degree of precision whether a scan line has crossed a row in the middle of a codeword, because if a row has been crossed, the codewords scanned will not yield the same f(X) as the previous row.

A row of codewords in accordance with the invention may conveniently contain unique start and stop codes in the conventional manner whose x-sequences are, e.g., 81111113 and 71121113 respectively. These start and stop codes are unique in that no other codeword in any cluster has the same t-sequence as either of them; furthermore, they are members of none of the final subsets of codewords because the required conditions $x_j \leq 6$ for all j=1, . . . , 8 is not true for those codes. The start code may be selected to have its widest bar away from the ensuing data codewords to reduce the possibility of intercodeword interference, as is the above start code: if desired, the stop code may be so selected as well.

Figures 3, 4:
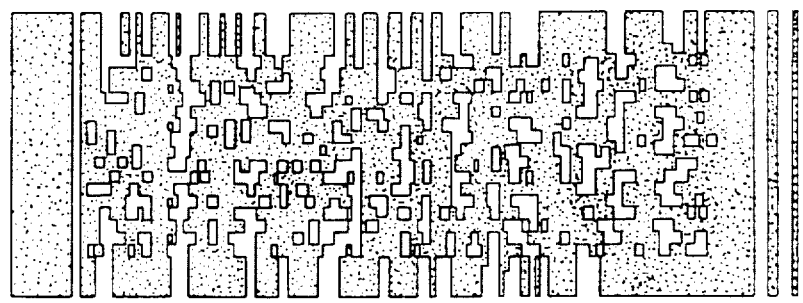
FIG. 3 is an exemplar layout of an illustrative high density two-dimensional symbology design in accordance with the invention.
FIG. 4 is a block-diagram illustration of the use of alternate sub-symbologies in different rows of a multi-row label in accordance with the invention.

The height to unit module ratio H (the ratio of the height of a codeword (or a row) to one module width) may be changed from label to label or even from row to row depending on the printing/scanner (system or channel) resolution, R, or on the need of various applications. FIG. 3 shows the first and the last rows having H approximately equal to 10, the rows in between having H approximately equal to 3, and the resolution R being approximately equal to 10 mil.

The first row of the multirow label uses cluster(0) codes, the second row cluster(3) codes, the third cluster(6) codes, the fourth cluster(0) codes, the fifth cluster(3) codes, and so on. There is no logical limit on the number of codewords per row or the total number of rows.

In the embodiment illustrated here, the first codeword in each row is dedicated for use as a row identifier and the last codeword in each row is a checksum. (The maximum number of rows is thus 929, i.e., the number of codewords in the dedicated cluster). It is of course possible to distinguish between forward scanning and backward scanning of the row by matching the start/stop codeword forwardly or backwardly.

4.6 Other Row-Wise Partitioning of Codewords

It will be apparent to those of ordinary skill having the benefit of this disclosure that the invention is not limited to the specific mark patterns, discriminator function f(X), and t-sequence described above. The foregoing method of deriving a symbology can be applied in a substantially similar manner to yield equivalent symbologies having other kinds of mark patterns.

For example, labels can be constructed from bars of varying shades of gray or even from bars of a wide range of colors, instead of from black and white marks only. In such a label, a discriminator function for dividing all possible mark patterns into mutually exclusive codeword subsets, and a t-sequence function for uniquely identifying each codeword within a subset, may be based on a readily detectable attribute of a mark such as its hue or its gray scale value as well as on the width of each mark (or in lieu of the width, or in combination with the width).

It will likewise be apparent that, broadly constructed, the same principle encompasses the equivalent use of codewords of different colors (or shades of gray) in alternate rows. That is, all rows of a multi-row label could use the same subset of mark patterns as codewords, but in different colors or shades or orientations; the determination whether a row has been crossed would be made based on whether a color or shade or orientation change had occurred.

4.7 Subset Organization for Two-Step Decoding

In the illustrative, width-based embodiment described above, since each cluster(i) includes 929 codewords, each t-sequence in a cluster thus will correspond to a number from 0 to 928. The codewords in each subset can be organized according to a base 30 system in which one codeword, representing a number in base 30, is used to signify two alphanumeric characters.

Codewords can be scanned and decoded as follows. When a codeword is scanned, its t-sequence is noted. The t-sequence is then used as input to an initial, low-level decoding step; the output from the low-level decoding step is a number from 0 to 928 which in turn is used as an input to a high-level decoding step.

4.8 Initial Low-Level Decoding Step

The low-level decoding step entails looking up the t-sequence in a table for the appropriate cluster to find a corresponding value. The table may be created as described above. Referring to FIG. 14A (a lookup table for cluster(0)), for example, the t-sequence 246764 corresponds to the value 111.

The actual circuitry for the lookup tables may be conventional; it will be appreciated by those of ordinary skill that the use of a prime number of codewords in a subset, e.g., 929, advantageously facilitates the design of the circuitry.

4.9 Mode-Dependent High-Level Decoding Step

The look-up value 111 from the foregoing example can be broken down into a two-number sequence in base 30, each number being in the range 0–29 and having a high-level value $V_H$ and a low-level value $V_L$. The base-30 sequence is computed as follows:

$V_H = x$ div 30; and $V_L = x$ mod 30.

For the t-sequence used above, 246764, yielding a look-up value of 111, the high level value is 3, and the low level value is 21, since 111=3×30+21. Each of the high and low values (i.e., 3 and 21) is then evaluated by looking it up in a suitable (arbitrary) table, such as shown in FIG. 5.

The exemplar table in FIG. 5 shows 30 decoding modes, including Alpha, Numeric, Mixed, and User modes. The various User modes are designated as the modes in FIG. 5 corresponding to columns 3 through 29 (with column 0 being Alpha mode).

In the illustrative embodiment, the Alpha mode is the default mode; therefore, the sample t-sequence 246764 ultimately translates into the two-letter sequence DV, via the lookup value 111 and the base-30 sequence 3, 21.

It will be seen that the coding arrangement depicted in FIG. 5 provides for mode switching that can be advantageously effected either within a single codeword or within a string of codewords. The technique for invoking mode switching varies depending on the current decoder mode.

4.10 Examples of High-Level Decoding

Figure 6:
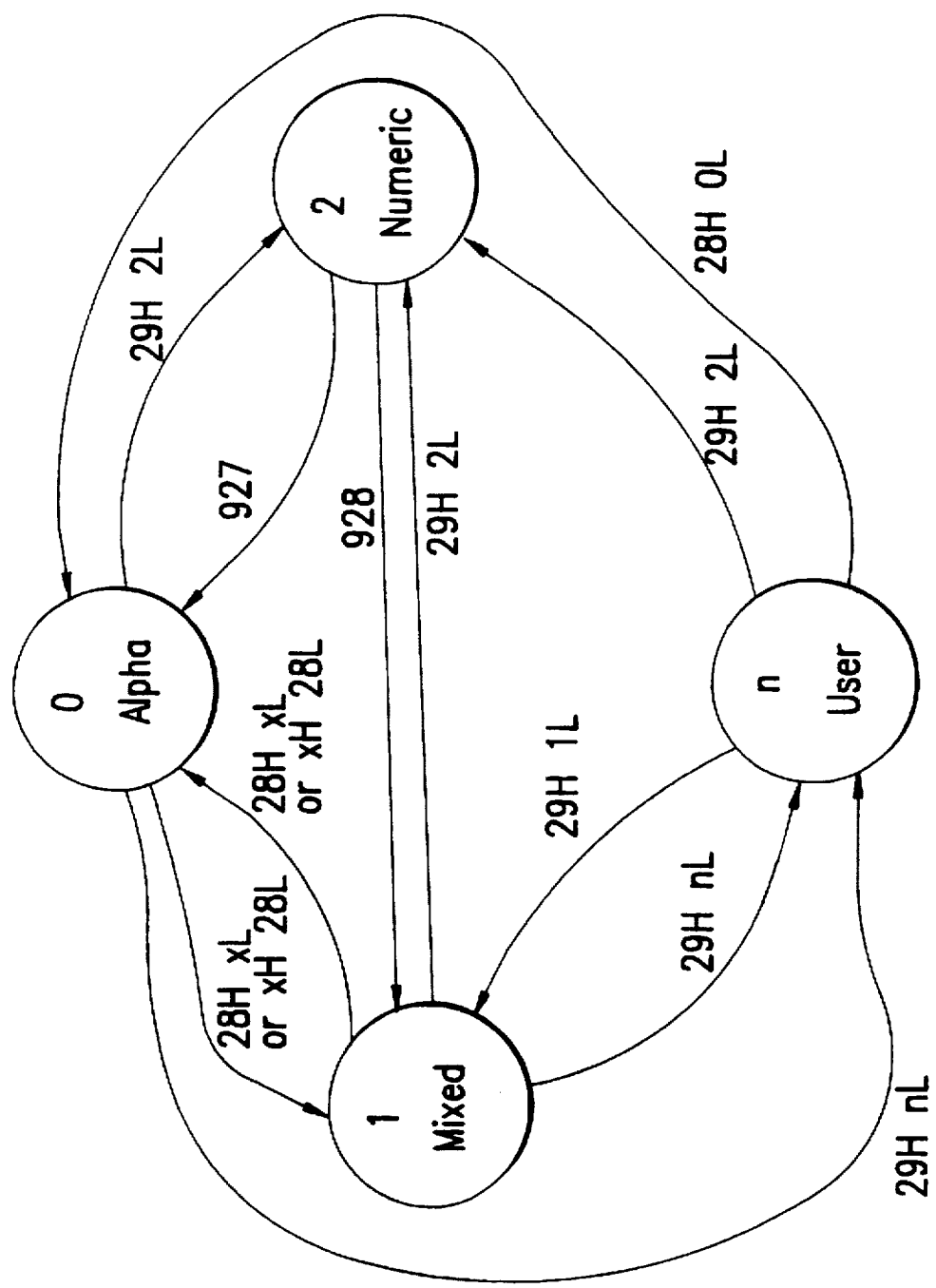
FIG. 6 is a state-machine diagram of aspects of a method for using the table shown in FIG. 5.

The state machine diagram in FIG. 6 illustrates a high-level decoding process in accordance with the invention for the exemplar embodiment. For convenience, a two-number sequence in base 30 is represented as "xxH xxL" or "(xxH, xxL)," where "xx" represents an arbitrary one- or two-digit number. For example, a high-level value of 18 and a low-level value of 10 is depicted herein as 18H, 10L or as (18H, 10L).

As an example, assume the decoder is currently in Alpha mode. As shown in FIG. 5, changing from Alpha mode to Mixed mode requires that either the high value or the low value of the two-digit base-30 sequence be equal to 28. If the high value is 28, then the low value is unimportant for mode switching purposes; likewise, if the low value is 28, then the high value is unimportant for mode switching purposes.

For Alpha mode, a high value of 28 signals to the decoder that a mode switch to Mixed mode (depicted in FIG. 5 as "ms" or Mixed-mode switch) must be effected; therefore, the low value of the high value/low value pair will be interpreted in the Mixed mode. A low value of 28 allows the decoder to interpret the high value of the high value/low value pair in the current mode, namely Alpha mode, and then to switch into Mixed mode. This mode switching technique allows a final value to be decoded in the current mode before switching to the next mode, therefore eliminating waste resulting from using an extra high value/low value pair to insure that a final high value is interpreted in the current mode.

With decoding being done in Alpha mode, a hypothetical value of 856 yields 28H 16L, i.e., a high value of 28 and a low value of 16 (since 856=28×30+16). The high value of 28 toggles the decoder into Mixed mode, and the low value 16, when translated according to Mixed mode protocol, yields "!" (an exclamation point).

To change from Alpha mode to User mode, a high value of 29 (depicted as "us" or User-mode switch) and any low value n within the range of 3 to 29 is required. Low values of 0, 1, or 2 result in no mode switch, a switch to Mixed mode, or a switch to Numeric mode, respectively. In contrast to switching from Alpha to Numeric or Mixed modes, a switch to a User mode cannot be done by a low value of 29; any such values are ignored.

Switching between other modes is done in a generally similar manner, as shown in FIGS. 5 and 6. Referring to those Figures, a decoder in Numeric mode can only directly switch to Alpha mode or Mixed mode. To toggle from Numeric mode to Alpha mode a non-position dependent value of 927 is required, i.e., either a high-level value or a low-level value equal to 927 will effect the mode switch. Likewise, to toggle from Numeric mode to Mixed mode a non-position dependent value of 928 is required. It will be apparent that the numbers 927 and 928 are the last two positions in the Numeric mode, and are reserved for mode-switching characters for convenience.

To change from User mode to one of the predefined modes (Alpha, Numeric or Mixed) a high value of 29 and a low value within the range 0 to 2 are required. The low value in this combination corresponds to the predefined mode into which the decoder is switching (i.e. a low value of 0 corresponds to Alpha mode, a low value of 1 corresponds to Mixed mode and a low value of 2 corresponds to Numeric mode.

For example, assume that the current mode is Alpha and that three consecutive codewords are to be decoded: 872, 345 and 99. Translating into base 30, 872 yields a high level value of 29 and a low level value of 2 (872=29×30+2). The first codeword 872 thus defines a User mode into which the decoder is switching. Referring to FIG. 5, if the decoder is an Alpha mode and a high level value of 29 and a low level value of 2 are encountered (as in the example above), the decoder changes to Numeric mode.

As another example, assume that the decoder is in Alpha mode and that the scanned codeword's lookup value is 723. In this case $V_H$=723 div 30=24, and $V_L$=723 mod 30=3. Therefore, the decoded codeword is (24H, 3L). Since the current mode is Alpha, FIG. 5 yields (Y.D) as the respective values for the decoded codeword (24H.3L).

Decoding of values in the Numeric mode differs from decoding of values in Alpha mode and Mixed mode. Decoding in Numeric mode treats a two-number sequence as a number in base 926. For example, suppose that the current mode is Alpha and that the following three codewords are encountered 872, 345 and 99. A base 30 conversion of the first codeword 872 yields H=29 and L=2. This sequence signals the decoder to switch from Alpha mode to Numeric mode. Switching to the radix-926 decoding system, the second and third codewords are decoded as (345×926)+99= 319569.

The User modes may be used with considerable flexibility. All or part of one or more modes may be used to represent a special user-defined code; for example, frequently-occurring words, phrases, sentences, paragraphs, etc. can be assigned to respective positions within a User mode. A given phrase, etc., can then be represented in the label as a single codeword (combined with a "us" mode-switch command if necessary). It will be apparent that a great many different words, phrases, etc., can be represented, e.g., in the coding scheme depicted in FIG. 5 as an illustration.

4.11 Encoding Method

An encoding procedure is the reverse process of the decoding procedure. For example, referring to FIG. 6, a license plate number "HUD-329" when encoded yields the following string of codewords: 230, 926, 843, 69. Each element of the original string "HUD-329" is located in FIG. 5 and translated according to proper mode protocol. The first four elements of the string are translated using Alpha mode. This results in H=7, U=20, D=3, and - (hyphen)=26.

The last three elements may be translated using Mixed mode. To switch to Mixed mode from Alpha mode a Mixed Shift (28) character is needed. The Mixed-mode translation then results in 3=3, 2=2 and 9=9. The complete string is thus 7 20 3 26 28 3 2 9.

This string is partitioned into high value/low value pairs, with resulting pairs (7,20) (3,26) (28,3) and (2,9). Each of these pairs is encoded as a codeword. To encode a high value/low value pair, the high value is multiplied by 30, and the low value is added to the result of this multiplication.

For example, the pair (7,20) is encoded by multiplying 7 times 30 and adding 20, yielding a result of 230. All four pairs are encoded in this manner; the resulting string is 230 116 843 69. The string is translated into codewords in accordance with the appropriate lookup table for the codeword subset in use. Assuming hypothetically that cluster(0) is in use, the string is expressed using the codewords corresponding respectively to t-sequences 335633 (for 230), 255663 (for 116), etc.

4.12 Checksum Computation

A checksum and error recovery scheme provides a row-oriented incremental error detection capability and high primitive decoding reliability. Within each row, a long polynomial division checksum scheme is used.

For convenience, each i-th codeword may be referred to by a corresponding index number $a_i$, i.e., by the result of the low-level decoding step discussed above for that codeword. Each codeword's index number $a_i$ will thus have a value from 0 to 928; each codeword is referred to sometimes for convenience by its index number.

Each row with codewords $a_{n-1}, a_{n-2}, \ldots a_0$ can be represented as a polynomial:

$$a(x)=(a_0+a_1x+a_2x^2 \ldots +a_{n-1}x^{n-1})$$

This polynomial is referred to herein as the message polynomial, as discussed in, e.g., Shu Lin & D. J. Costello, Jr., Error Control Coding, 1983.

A row checksum $b_{1,0}$ is defined as the remainder resulting from dividing the message polynomial a(x) by a generator polynomial (see ibid.):

$$g_r(x)=x+926$$

Those of ordinary skill will recognize that 926 is the complement of 3 in a Galois Field based on 929, or GF(929).

The checksum of each row can conveniently be computed using the checksum encoding circuit shown in FIG. 8. In FIGS. 8 through 13, the circle-plus (modulo addition), circle-X (modulo multiplication), and circle-C (modulo complementation) symbols are defined over GF(929) as:

$$x(circle-plus)y=(x+y) \bmod 929$$

$$x(circle-X)y=(x+y) \bmod 929$$

$$(circle-C)x=929-x$$

where x and y are any numbers from 0 to 928. It will of course be recognized that the design and construction of actual circuitry is a matter of routine implementation by those of ordinary skill. Such circuitry consequently is not further discussed here.

To perform the checksum computation, the register $b_{r0}$ is initialized to 0. The input is a sequence of the codewords' index numbers $a_i$ in a row, fed one number at a time into the input. The input fans into the output line (e.g., to a label printer) and the checksum encoding circuit simultaneously.

As the first codeword is input, the circle-plus computation is performed with the codeword's number $a_i$ sequence and $b_{r0}$ (i.e., 0) as operands. The output of that computation and the number 926 is fed to the circle-X computation; the output of that computation is complemented and stored in the $b_{ro}$ register. After all of the codewords in a row have been processed through the checksum encoding circuit, the complement of the final value of $b_{ro}$ is the checksum and is appended at the end of the row. The sequence of codewords for the row (e.g., as printed ) is now $a_{n-1}$, $a_{n-2}$, . . . $a_0$, 929–$b_{ro}$.

A similar scheme is used to compute a structure checksum, one representing the entire label. For this second type of checksum, all codewords in the label as printed (including the codewords representing the checksums for each row except the last row) form the message polynomial, which may be expressed as:

$$a(x) = a_{m,2} + a_{m,3}x + \ldots + a_{m,n-1}x^{n-3}$$
$$+ b_{m-1,0}x^{n-2} + \ldots a_{1,n-1}x^{nm-3}$$

where the coefficients are defined as in FIG. 10, tracing backwardly from right to left and bottom to top. A different generator polynomial is used to calculate a remainder in a similar fashion as before, namely:

$$g_s(x) = (x+926)(x+920)$$

Dividing the new message polynomial by this new generator polynomial results in a remainder $b(x) = b_{50} + b_{51}x$. Complementing the coefficients of this remainder yields two parity-check codewords, which serve as a structure checksum as discussed below.

In implementation, this division is accomplished by using a division circuit such as shown in FIG. 9. The registers $b_{50}$ and $b_{51}$ are initialized as zeros. As soon as the message polynomial has entered the output and the circuit, the complements of the parity-check codewords are in the registers and are appended in the order $b_{51}$, $b_{50}$ just before the checksum of the last row. Then the checksum $b_{ro}$ of the last row is computed and appended to the end of the last row, as shown in FIG. 10.

It will be noted that there are no user-definable codewords corresponding to the positions $a_{m,1}$ and $a_{m,0}$. These positions are reserved for the codewords $b_{s,1}$ and $b_{s,0}$ as shown in FIG. 10. Thus, in a label with m rows and n codewords per row, the total number of user definable codewords is nm–4m–2, i.e., the number of codewords per row times the number of rows, minus four codewords for each row (a start code, a stop code, a row number, and a row checksum), and also minus the two parity-check codewords (i.e., the structure checksum).

4.13 Gross Error Detection

Gross error detection may be accomplished as follows. At the beginning of the scanning process, all entries (e.g., "slots" or "grid locations") of the map of the label are initialized to indicate unknown characters.

The low-level decoding step, as applied to a signal generated by any given scanning pass, will generate a sequence of one or more index numbers, one for each codewords that was scanned. Each index number may be any number from 0 to 928, depending on the t-sequence of the corresponding scanned codeword.

For each scanning pass, three arrays DA, CA, and FA are constructed (e.g., in memory in accordance with conventional techniques) to represent the codewords scanned in that pass:

A "decoding array" DA represent the index numbers that are obtained from the tables in FIGS. 14A through 16D and that correspond to the scanned codewords.

A "cluster array" CA represents the clusters or subsets to which the respective scanned codewords belong.

A "confidence array" FA represents the confidence existing in the accuracy of the decoding of the respective scanned codewords.

For example, a scanning pass and low-level decoding step may generate a decoding array DA comprising a sequence of index numbers such as (293, 321, 209, 99, 679). The corresponding sequence of clusters might be (3, 3, 0, 0, 0) indicating that the first two codewords were members of cluster(3) and the final three were members of cluster(0). This implies that the subsequence comprising the second and third codewords (represented by 321 and 209 in the array DA) bracket the point at which a row was crossed, i.e., that the two codewords are in two adjacent rows. Because such row-crossing subsequences frequently have higher error probability, they are assigned a relatively low weight in a confidence array FA. In the example above, the confidence array FA for the scanned codewords might be (3, 1, 1, 3, 3).

Now suppose that a previous scanning pass had resulted in a decoding array D of (293, 329, 222, 999, 999) for the same sequence of codewords, where 999 represents an unknown codeword whose confidence level is zero. Further assume that the confidence array FA for that previous scanning pass is (3, 3, 1, 0, 0), because the row was crossed between the third and fourth characters on that pass instead of between the second and third characters as hypothesized in the previous paragraph.

A "voting" process may be used to compare the confidence arrays for the two scanning passes to determine which results are more likely to be correct. For example, the voting rules may be as follows:

1. If two successive scans of a given codeword result in the same index number after low-level decoding, then the corresponding confidence figures in the two confidence arrays FA are added;

2. In contrast, if two successive scans result in different numbers for the same codeword, then (a) if one of the two index numbers has a higher confidence level than the other, the higher-confidence index number "survives" and is filled into the decoding array DA, but the confidence level for the corresponding position in the confidence array FA is reduced by the confidence level for the nonsurviving index number, (b) if both index numbers have equal confidence levels, then neither index number survives; instead the unknown codeword index number 999 is used as the "surviving" index number and the confidence is reset to zero; and 3. If the index number $a_i$ for one scan of a given codeword is 999 (representing an unknown codeword) and an acceptable index number for the other scan (i.e., an index number from 0 to 928), then the acceptable index number is kept, and the confidence level of that index number remains the same.

It will of course be appreciated by those of ordinary skill that a wide variety of conventional array- and memory-management techniques may be used for creating and manipulating the arrays DA, CA, and FA. For example, the decoding array DA might be the label map itself, with a temporary array being used to hold the index numbers $a_i$ for a new scan and with surviving index numbers from that scan being written into the appropriate position in the array DA (or perhaps not written if the same index number is already represented at that position). In such an example, the cluster array CA and the confidence array FA might each be "shadows" of the decoding array DA, with as many positions in each as there are in the decoding array DA.

When the decoding array DA has been filled with an acceptable index number $a_i$ for all codeword positions corresponding to a particular row in the label, the representation of that row in the decoding array DA is set aside. That is, regardless of the confidence that exists about the accuracy of the contents of the decoding array DA, once the row has been decoded to indicate acceptable index numbers for each codeword, no further decoding is done for codewords in that row; additional error detection proceeds as described below.

4.14 Further Error Detection and Recovery by Checksumming

Errors may still exist in the decoding array DA for a particular row even after that row is set aside. Before performing high-level decoding, the redundant information stored in the row checksums and the label checksum can advantageously be used to detect and/or recover from errors in scanning any particular codeword by a process of elimination.

Generally speaking, if all but one or two of the codewords in the entire label are known to be correct, the correct values of the unknown codewords can be computed by "subtracting" (so to speak) the values of the known codewords from the values of the checksums, which of course reflect the values of all codewords, known and unknown.

Errors in any particular row may be detected by using a syndrome divider such as shown in FIG. 11. The register $d_{ro}$ is initialized to zero. After the index numbers $a_i$ of the scanned row are fed to the syndrome divider, the register $d_{ro}$ indicates the detection results. If $d_{ro}$ is equal to zero, the corresponding row was correctly scanned and its image or map in memory can be locked; otherwise, an error occurred in the scanning and decoding of the row, and the row must be rescanned. If all codewords in the label are decoded and check summed without error, then the following error recovery step can be skipped.

When the total number of still-unknown codewords is less or equal to two, an error recovery scheme as follows can be invoked. The unknown codewords first are replaced in the label map with zeros. A syndrome $S_i$ is then computed for each i=1,2. Since by hypothesis the position $p_v$ of the unknown (i.e., erroneous) codewords is known, where v=1, 2, only the values of those unknown codewords need by computed. As a first step, an error value $e_{P_v}$ is computed for each error position $P_v$ by solving the following system of matrix equations:

$$\begin{bmatrix} S_1 \\ S_2 \end{bmatrix} = \begin{bmatrix} 3^{p1} & 3^{p2} \\ 3^{2(p1)} & 3^{2(p2)} \end{bmatrix} \begin{bmatrix} e_{p1} \\ e_{p2} \end{bmatrix}$$

If only one error exists, the system becomes overdetermined, that is, more information is present than is needed to solve the above matrix, which reduces to:

$$\begin{bmatrix} S_1 \\ S_2 \end{bmatrix} = \begin{bmatrix} 3^{p1} \\ 3^{2(p1)} \end{bmatrix} e_{p1}$$

For an assumed one-error case, if the above matrix equation system is consistent (that is, if the foregoing two matrix equations yield the same solutions), then one error does indeed exist and the solution of $3^{p1}$ is the error value, i.e., the correct value of the unknown codeword. Otherwise, an undiscovered second error exists in the label, and the decoding result is rejected.

After successfully solving for the error values, the complement of error values are filled into the corresponding unknown codewords' locations. Then the error detection computation is performed again for those rows containing unknown codewords. If no errors are detected, the decoding result then is taken as correct; otherwise, the decoding result is likewise rejected.

4.15 Nonvolatile memory and Computer System

Referring to FIG. 18, a nonvolatile electro-optical memory 100 may be created by marking a suitable substrate (e.g., paper) with one or more labels in accordance with the foregoing description. The memory 100 may be combined with a fixed or movable scanner 110 for use as a storage device for a suitably programmed computer such as a processor 120.

For example, a robot might have an on-board computer programmed to control the robot to perform simple tasks, such as selectively moving an object 130 by means of a manipulator 140. An on-board scanner 110 might operate as the robot's "eyes" for reading labels of the kind described above. In similar fashion, a conveyor system might include a fixed scanner 130 and a moving belt that served as the manipulator 140. The label preferably contains a list of instructions for operating the robot, with the computer on-board. The robot responding to data and instructions contained on the label.

4.16 Additional Illustrative Embodiments

It will of course be recognized by those of ordinary skill (having the benefit of this disclosure) that the invention is capable of being adapted to other uses and in other embodiments than the illustrative ones disclosed above. Furthermore, the invention may be implemented in numerous specific architectures. A few examples are briefly mentioned below for illustrative purposes:

The decoder of a conventional one-dimensional scanner could be reprogrammed to perform one or more of the functions described above, e.g., by replacing a read-only memory (ROM) chip containing the programming if the scanner is so constructed;

A scanning system could be built using a suitably programmed microprocessor or other computational unit to perform one or more of the above functions. The programming could be loaded into dynamic read-write memory (RAM), or could be "burned" into read-only memory (ROM) either onboard or outboard of the microprocessor;

A scanning system could be built using a computation unit specially designed to perform the functions described above;

Parallel processing technology could be used to partition the work of decoding the various parts of a label;

and so forth. The actual design and construction of any particular implementation is a matter of routine for those of ordinary skill having the benefit of this disclosure, the details of which are not further discussed here.

Referring to FIG. 18, a computer system including a nonvolatile memory 100 of the type described could be used in a number of applications. As an illustration, an overnight package delivery service (e.g., Federal Express, UPS, Purolator, and the like) might have certain of its package-sorting functions automated through the use of memories 100 in the form of printed labels in accordance with the foregoing, applied to packages such as the object 130 shown in the figure. In one such possibility, package shippers would fill out a waybill 100 by responding to queries posed by a suitable computer program. The program's printed output (e.g., on a laser printer or dot matrix printer) might include both a human-readable destination address and a label 100 as described above in which that information was encoded in scannable form. The shipper would affix the printed waybill 100 to the object 130 being shipped. (Other information such as the shipper's telephone number and the like could likewise be so encoded.) One of the key advantages of the high data capacity memory 100 of the present invention is that it may be created at the warehouse or loading dock by an inexpensive printer so that updated or corrected information may be applied at the point of shipment. The fact that the memory is merely a paper label means that it is inexpensive and disposable. Thus, the present invention may be implemented in conjunction with a portable terminal and thermal printer to create and print a label, even in a remote location. Such a portable terminal, connected to scanner, allows the use to scan, print, and apply the label to the article quickly and inexpensively. At various points during shipment, suitable robots could read the label 100 and, using manipulators 140, direct the object 130 appropriately; e.g., a scanner 110 could read the memory 100 to generate a signal; based on the content of that signal, a manipulator 140 controlled by a processor 120 could move the object 140 as appropriate.

A similar arrangement could be used in a warehouse inventory control system. A label of the type described could be printed or otherwise applied to or inscribed on one or more sides of a shipping carton or directly to merchandise. The label might have encoded therein as much information as desired about the specific item, e.g., its type, color, dimensions, weight, point of manufacture, lot number, and so forth. A suitable robot could be used as an order-filling machine by moving within the warehouse and, using its scanner, searching for merchandise whose label indicates that it matches a specified order. (Searching could of course be in accordance with techniques now known or hereafter developed.) It will be apparent that this arrangement would permit information about specific merchandise items to be stored locally at the merchandise itself.

Such local storage could advantageously take the place of a separate file of information about the item, e.g., stored in a computer data base and keyed to a bar-code serial number on the item. Local storage would reduce the problem of dealing with "orphan" merchandise whose serial numbers were not known to the computer data base. In addition, it would permit rapid in-processing of newly-received merchandise shipments, in that complete information about the new merchandise could be scanned into the warehouse's information system, obviating the need for the shipper to generate and transmit a separate information file (e.g., on a computer tape or by hard copy) about the specific items being shipped. This would similarly be advantageous in, e.g., libraries or other organizations that regularly received shipments of books or similar objects that required cataloging.

Another feature of the present invention is to utilize the bar code according to the present invention so that it may be affixed to an article as a means of identifying that article and associating information with the article much like a "read-only memory" or identification tag implemented in so called RF ID systems. One such implementation is to print a variety of different bar code symbols which are available in easily disposable and affixable format so that information may be easily and quickly affixed to the article. One example of an application is in connection with the repair and service of equipment. The use of a service record is useful for quality control and documentation purposes, but it is often impractical to store detailed written records with the equipment. The use of a high density, encoded services report affixed to the equipment in the form of a two-dimensional bar code is especially advantageous. The service technician may select the appropriate PDF label from a set of labels corresponding to repairs performed, and attach the label to the repaired equipment. If the equipment is returned for subsequent repairs, the service technician has the complete service history attached to the equipment in only a few square miles.

As another example, a nonvolatile memory and scanner system could be used for enhanced searching of microfilm rolls or microfiche sheets. Assume that a large body of text and/or graphical information is stored photographically on a roll of microfilm. An example of such information might be the thousands of documents—printed, typed, handwritten, drawn, or a combination thereof—that can be involved in a large litigation. Known computerized litigation support systems permit paralegals to summarize each document page in a data base; for each document page, selected information from the data base could be inscribed as a label in accordance with the foregoing on the corresponding frame of microfilm, in a corner or other appropriate location.

As shown in FIG. 22, a microfilm reader 205 could be equipped with (a) input means such as a keyboard 215 by which a user could specify search criteria (e.g., in Boolean logic); (b) a fixed scanner 210 to read microfilm labels as the microfilm was scrolled; and (c) control means 220 to determine whether a given microfilm frame satisfied the specified search criteria. The user would then be able to view documents conveniently. In the case of multiple-reel document collections, a master index or indexes could be encoded on a separate reel; output means such as a CRT 200 or an LCD or LED display could be used to instruct the user as to which reel to mount to locate the specific document desired.

For example, a microfilm reader with a scanner might be designed to be coupled to and controlled by a conventional desktop, laptop, or notebook computer 220 in a conventional manner as a peripheral device (or the essentials of such a computer could be built into the reader). The computer would not need to have the entire document-summary data base available on disk storage, since the microfilm itself would contain the necessary information; it would suffice if the computer was programmed (e.g., in ROM) to perform the desired search functions using the label-encoded data from the microfilm.

Still another feature of the present invention is to provide a method for processing information by optically scanning indicia on the surface of a substrate, the indicia including a plurality of codewords scanned sequentially and organized into at least two independent scanning paths, each codeword being either an information codeword or a control codeword, and each information codeword corresponding to at least one information-containing character. A plurality of different mapping functions are provided each associating the code word with one character out of a set of different characters, with only one mapping function being active at any given time. Each codeword in any one scanning path is distinct from any codeword in an adjacent scanning path. Using such a codeword data structure, the method includes the steps of: determining whether a scanned codeword is an information codeword or a control codeword; decoding the codeword according to the mapping function if said codeword is an information codeword; and processing the codeword if the codeword is a control codeword. If the codeword is a control codeword, it identifies a new mapping function, and processing of subsequently scanned codewords take place using the new mapping function.

As an example of the different scanning paths that may be used, and a different organization of the codewords, reference is made of FIGS. 19 and 20.

FIGS. 19a, 19b, 19c, and 19d is an alternative type of laser scanning pattern that may be used in connection with the present invention.

The present invention may be implemented in a hand-held, laser-scanning, bar code reader until such as illustrated in FIG. 21. This hand-held device of FIG. 21 is generally of the style disclosed in U.S. Pat. No. 4,760,248, issued to Swartz et al., assigned to Symbol Technologies, Inc., and also similar to the configuration of a bar code reader commercially available as part number LS 8100II from Symbol Technologies, Inc. Alternatively, or in addition, features of U.S. Pat. No. 4,387,297 issued to Swartz et al., or U.S. Pat. No. 4,409,470 issued to Shepard et al., both such patents assigned to Symbol Technologies, Inc., may be employed in constructing the bar code reader unit of FIG. 21. These U.S. Pat. Nos. 4,760,248, 4,387,297 and 4,409,470 are incorporated herein by reference. An outgoing light beam 151 is generated in the reader 100, usually by a laser diode or the like, and directed to impinge upon a bar code symbol a few inches from the front of the reader unit. The outgoing beam 151 is scanned in a fixed linear pattern, or more complex pattern such as shown in FIG. 19 may be employed and the user positions the hand-held unit so this can pattern traverses the symbol to be read. The use of a central dark portion, such as in FIG. 19d, may be used for aiming, or other visual techniques associated with alignment. Reflected light 152 from the symbol is detected by a light-responsive device 146 in the reader unit, producing serial electrical signals to be processed for identifying the bar code. The reader unit 100 is a gun shaped device, having a pistol-grip type of handle 153 and movable trigger 154 is employed to allow the user to activate the light beam 151 and detector circuitry when pointed at the symbol to be read, thereby saving battery life if the unit is self-powered. A light-weight plastic housing 155 contains the laser light source, the detector 146, the optics and signal processing circuitry, and the CPU 140 as well as a battery 162. A light-transmissive window 156 in the front end of the housing 155 allows the outgoing light beam 151 to exit and the incoming reflected light 152 to enter. The reader 100 is designed to be aimed at a bar code symbol by the user from a position where the reader 100 is spaced from the symbol, i.e., not touching the symbol or moving cross the symbol. Typically, this type of hand-held bar code reader is specified to operate in the range of perhaps several inches.

As seen in FIG. 21, a suitable lens 157 (or multiple lens system) is used to collimate and focus the scanned beam into the bar code symbol at an appropriate reference plane, and this same lens 157 may be used to focus the reflected light 152. A light source 158 such as a semiconductor laser diode is positioned to introduce a light beam into the axis of the lens 157 by a partially-silvered mirror and other lenses or beam-shaping structure as needed, along with an oscillating mirror 159 which is attached to a scanning motor 160 activated when the trigger 154 is pulled. If the light produced by the source 158 is not visible, an aiming light may be included in the optical system, again employing a partially-silvered mirror to introduce the beam into the light path coaxially with the lens 157. The aiming light, if needed, produces a visible-light spot which is scanned just like the laser beam; the user employs this visible light to aim the reader unit at the symbol before pulling the trigger 154.

In real applications, either the length of bar code should be fixed, or an additional character should be placed in the bar code to indicate its length. If not, misdecodings may occur.

If the length of the bar code is fixed, the performance of decoding using stitching might be better than that of decoding using a complete scan, because the reject rate and the misdecode rate is less in most good quality bar codes (in cases where the quality of the bar code is very poor, the misdecode rate may be greater, but never greater than 2K times. Where K is the number of the scans used for stitching).

Although the present invention has been described with respect to multiple line bar codes, it is not limited to such embodiments. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The following claims are intended to encompass all such uses, implementations, and embodiments.

What is claimed is:

1. An apparatus for identifying a subset of desired items from a set of items, comprising:

input means for allowing a user to provide item criteria;

means for reading machine-readable symbols included on a medium, each symbol containing data describing content associated with a respective item of the set of items; and search means for determining which of the read symbols satisfies the item criteria, wherein the medium comprises microfilm.

2. An apparatus for identifying a subset of desired items from a set of items, comprising:

input means for allowing a user to provide item criteria;

means for reading machine-readable symbols included on a medium, each symbol containing data describing content associated with a respective item of the set of items; and search means for determining which of the read symbols satisfies the item criteria, wherein:

each symbol comprises a bar code symbol having at least two adjacent rows of codewords, each codeword representing at least one information-bearing character, and being selected from among a set of detectable mark/space patterns, each mark/space pattern having a determinable discriminator function value, each row has codewords selected from a subset of mark/space patterns corresponding to a unique discriminator function value, and the discriminator function values corresponding to adjacent rows of codewords are mutually exclusive to one another.

3. The apparatus according to claim 2, wherein the reading means includes means for computing discriminator function values for respective mark/space patterns.

4. The apparatus according to claim 3, wherein the reading means further includes means for determining, from the computer discriminator function values, the row containing each of the scanned codewords.

5. The apparatus according to claim 2, wherein the reading means includes means for decoding the codewords of read symbols into symbolic values.

6. The apparatus according to claim 5, wherein the search means includes means for determining whether the symbolic values satisfy the search criteria.

7. An apparatus for identifying a subset of desired items from a set of items, comprising:

input means for allowing a user to provide item criteria;

means for reading machine-readable symbols included on a medium, each symbol containing data describing content associated with a respective item of the set of items; and search means for determining which of the read symbols satisfies the item criteria, wherein the reading means comprises a bar code scanner, the bar code scanner including:

means for emitting a light beam onto the symbols;

means for receiving light reflected from the symbols; and means for converting the received light into signals representing respective symbols.

8. An apparatus for locating desired documents from a set of documents stored on microfilm, each document of the set arranged on the microfilm adjacent to a corresponding bar code symbol containing text data describing content associated with the document, the apparatus comprising:

a keyboard for allowing a user to enter a search query containing at least one word;

a microfilm reader for accessing the documents and bar code symbols stored on the microfilm;

a bar code scanner for reading the bar code symbols from the microfilm; and a controller, connected to the keyboard and bar code scanner, for determining which of the read bar code symbols matches the search query.

9. The apparatus according to claim 8, wherein the bar code scanner comprises a bar code scanner for reading two-dimensional bar code symbols.

10. The apparatus according to claim 9, wherein each two-dimensional bar code symbol has at least two adjacent rows of codewords, each codeword representing at least one information-bearing character, the codeword selected from among a set of detectable mark/space patterns, each mark/space pattern having a determinable discriminator function value, each row having codewords selected from a subset of mark/space patterns corresponding to a unique discriminator function value, and the discriminator function values corresponding to adjacent rows of codewords being mutually exclusive to one another.

11. The apparatus according to claim 10, wherein the bar code scanner includes means for computing discriminator function values for respective mark/space patterns.

12. The apparatus according to claim 11, wherein the bar code scanner further includes means for determining, from the computer discriminator function values, the row containing each of the scanned codewords.

13. The apparatus according to claim 10, wherein the bar code scanner includes means for decoding the codewords of the read symbols into symbolic values.

14. The apparatus according to claim 13, wherein the controller includes means for determining whether the symbolic values satisfy the search query.

15. A method of identifying a subset of desired items from a set of items, comprising the steps of:

receiving item criteria;

reading machine-readable symbols from a medium, each symbol containing data describing content associated with the respective item; and determining which of the read symbols satisfies the item criteria, wherein the medium comprises microfilm.

16. A method of identifying a subset of desired items from a set of items, comprising the steps of:

receiving item criteria;

reading machine-readable symbols from a medium, each symbol containing data describing content associated with the respective item; and determining which of the read symbols satisfies the item criteria, wherein:

each symbol comprises a bar code symbol having at least two rows of codewords, one row adjacent to and beneath another, each codeword represents at least one information-bearing character, the codeword selected from among a set of detectable mark/space patterns, each mark/space pattern has a determinable discriminator function value, each row has codewords selected from a subset of mark/space patterns corresponding to a unique discriminator function value, and the discriminator function values corresponding to adjacent rows of codewords are mutually exclusive to one another.

17. The method according to claim 16, wherein the step of reading comprises the substep of computing discriminator function values for respective mark/space patterns.

18. The method according to claim 17, wherein the step of reading comprises the further substep of determining, from the computer discriminator function values, the row containing each of the scanned codewords.

19. The method according to claim 16, wherein the step of reading comprises the substep of decoding the codewords of read symbols into symbolic values.

20. The method according to claim 19, wherein the step of determining which of the symbols satisfies the search criteria comprises the substep of determining whether the symbolic values satisfy the search criteria.

21. A method of identifying a subset of desired items from a set of items, comprising the steps of:

receiving item criteria;

reading machine-readable symbols from a medium, each symbol containing data describing content associated with the respective item; and determining which of the read symbols satisfies the item criteria, wherein the step of reading symbols comprises the substeps of:
  emitting a light beam onto the symbols;
  receiving light reflected from the symbols; and
  converting the received light into signals representing respective symbols.

22. A method of locating desired documents from a set of documents stored on microfilm, each document of the set arranged on the microfilm adjacent to a corresponding bar code symbol containing text data describing content associated with the document, the method comprising the steps of:
  entering a search query containing at least one word;
  reading the bar code symbols from the microfilm; and
  determining which of the read bar code symbols matches the search query.

23. The method according to claim 22, wherein the bar code symbols comprise two-dimensional bar code symbols.

24. The method according to claim 23, wherein each two-dimensional bar code symbol has at least two rows of codewords, one row adjacent to and beneath another, each codeword representing at least one information-bearing character, the codeword selected from among a set of detectable mark/space patterns, each mark/space pattern having a determinable discriminator function value, each row having codewords selected from a subset of mark/space patterns corresponding to a unique discriminator function value, and the discriminator function values corresponding to adjacent rows of codewords being mutually exclusive to one another.

25. The method according to claim 24, wherein the step of reading includes the substep of computing discriminator function values for respective mark/space patterns.

26. The method according to claim 25, wherein the step of reading further includes means the substep of determining, from the computer discriminator function values, the row containing each of the scanned codewords.

27. The method according to claim 24, wherein the step of reading includes the substep of decoding the codewords of read symbols into symbolic values.

28. The method according to claim 27, wherein the step of searching includes the substep of determining whether the symbolic values satisfy the search query.

* * * * *